(12) United States Patent
Wilson et al.

(10) Patent No.: US 10,670,390 B2
(45) Date of Patent: Jun. 2, 2020

(54) SYSTEM AND METHOD FOR VERIFYING PROJECTION ACCURACY

(71) Applicant: FARO Technologies, Inc., Lake Mary, FL (US)

(72) Inventors: Todd P. Wilson, Parkesburg, PA (US); Kelley Fletcher, Costa Mesa, CA (US); Arkady Savikovsky, Burlington, MA (US); Masoud Mohazzab, Andover, MA (US); Robert E. Bridges, Kennett Square, PA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 16/161,168

(22) Filed: Oct. 16, 2018

(65) Prior Publication Data

US 2019/0145758 A1   May 16, 2019

Related U.S. Application Data

(60) Provisional application No. 62/585,172, filed on Nov. 13, 2017.

(51) Int. Cl.
*G01B 11/25* (2006.01)
*G01B 11/00* (2006.01)

(52) U.S. Cl.
CPC ........ *G01B 11/2513* (2013.01); *G01B 11/005* (2013.01)

(58) Field of Classification Search
CPC .......................... G01B 11/005; G01B 11/2513
USPC .................................................. 356/601–640
See application file for complete search history.

(56) References Cited

U.S. PATENT DOCUMENTS

| 7,577,296 B2 | 8/2009 | Easley et al. | |
| 2017/0167870 A1* | 6/2017 | Nishita | G01C 15/002 |
| 2017/0221224 A1* | 8/2017 | Domae | G01B 11/002 |

OTHER PUBLICATIONS http://hubbsmachine.com/retro-reflective-contrast-photogrammetry-targets/40-r15s.html retrieved Nov. 13, 2017.

* cited by examiner

*Primary Examiner* — Tri T Ton
(74) *Attorney, Agent, or Firm* — Cantor Colburn LLP

(57) ABSTRACT

A method for verifying performance of a light projector includes establishing a reference artifact that include reflective makers and an interior edge line, determining with a laser-tracker-based three-dimensional (3D) measuring system 3D coordinates of the reflective targets and the interior edge line, determining with the light projector angles to the reflective markers with the light projector, and projecting with the light projector a pattern of light onto the interior edge line.

2 Claims, 27 Drawing Sheets

SYSTEM AND METHOD FOR VERIFYING PROJECTION ACCURACY

CROSS REFERENCE TO RELATED APPLICATIONS

This application claims the benefit of U.S. Provisional Application Ser. No. 62/585,172, filed Nov. 13, 2017, the entire disclosure of which is incorporated herein by reference.

BACKGROUND

The subject matter disclosed herein relates to a system and method of visual verification, and in particular to a system and method of a visual verification of an accuracy of a light projection.

Light projection devices (often referred to as "laser projection devices") are used in a variety of applications to project images onto objects. In some applications, an illuminated three-dimensional (3D) pattern, also referred to as a "template," are projected onto an object. The template may be formed, for example, by projecting a rapidly moving, vector-scan, light beam onto the object. In some systems, the projected light beam is a laser beam. The light beam strikes the surface of the object following a predetermined trajectory in a repetitive manner. When moved at a sufficiently high beam speed and refresh rate, the trace of the projected beam on the object appears to the human eye as a continuous glowing line. The projected pattern of light appears as the glowing template that can be used to assist in the positioning of parts, components and work pieces. In some cases, the projected template is based partly on computer aided design (CAD) data of the object.

It should be appreciated that light projection devices may have a number of calibration parameters (also referred to as compensation parameters) that may change over time. Therefore, it is desirable for the operator to have a means for verifying the accuracy of the light projection. One method of accuracy verification uses an artifact (or reference artifact) such as the artifact 10 shown in FIG. 1A. The artifact 10 is a made of a rigid and stable material of known shape and size. The artifact 10 usually has a relatively low coefficient of thermal expansion (CTE), such as aluminum or steel. A plurality of reflective markers 12 are mounted on the artifact 10. In addition, one or more geometric elements 13 are inscribed into the artifact or applied to the artifact. For example, the inscribed geometric elements 13 may include squares 14, circles 16, and diamonds 18. The inscribed geometric elements may be measured with an articulated arm coordinate measurement machine (AACMM) that includes a tactile probe having a fine probe tip. The positions of the reflective markers 12 may likewise be measured with the AACMM, possibly in combination with an additional measuring system such as a photogrammetry system or a laser tracker. The result of these measurements is to obtain 3D coordinates of the inscribed pattern 11 relative to the reflective markers 12. It should be appreciated that artifacts are relatively costly and time consuming to produce.

To verify proper operation of the light projection device, the light projection device emits light onto the artifact 10. Light reflected from the reflective markers 12 is detected by the light projection device. The light projection device further determines the angular position of each of the reflective markers 12 and, from these angular positions, determines the pose of the reference artifact 10 relative to the light projection device. The determined pose is used to determine the position of the inscribed pattern 13 relative to the light projection device. The projector then attempts to project the glowing template onto the inscribed pattern 13 (also referred to as the one or more inscribed elements 13). An operator inspects the glowing template in relation to the inscribed pattern 13 to determine whether the light projection device lies within limits of the inscribed pattern 13, thereby verifying that the light projector is performing according to its specification. For example, the light projection device may project the glowing template onto the inscribed pattern 11 that includes the geometric shapes 14, 16, 18. When the projected light template does not lie directly on the inscribed pattern 13, the operator may take additional steps to have the light projection device serviced or calibrated.

In many cases, users would prefer to perform calibration of reference artifacts on site rather than returning the artifacts back to a manufacturer's calibration laboratory. In other cases, users would prefer larger artifacts than are commercially available from a manufacturer. In still other cases, users would prefer a more flexible way of creating reference artifacts.

Accordingly, while existing systems and methods of verifying the accuracy of a light projection device are suitable for their intended purposes, the need for improvement remains, particularly in providing a system and method of verifying the accuracy of a light projection, such as for creating artifacts in a flexible manner or obtaining artifacts that are larger than are available commercially. The need also remains for obtaining calibration of artifacts in a cost-effective manner.

BRIEF DESCRIPTION

According to one aspect of the disclosure, a method comprises: establishing a reference artifact that includes an interior edge line formed from an intersection of two surfaces, the reference artifact further including a collection of reflective markers; with a three-dimensional (3D) measuring system, measuring 3D coordinates of the interior edge line and 3D coordinates of the collection of reflective markers, the 3D measuring system including a laser tracker, a probing device, and a retroreflector coupled to the probing device; with a light projector, measuring angles to the collection of reflective markers; with the light projector, projecting a pattern of light onto the interior edge line, the projected pattern of light based at least in part on the measured 3D coordinates of the interior edge line, the measured 3D coordinates of the reflective markers, and the measured angles to the collection of reflective markers; and storing the measured 3D coordinates of the interior edge line and the 3D coordinates of the collection of reflective markers.

In addition to one or more of the features described herein, or as an alternative, further embodiments of the method may include verifying by an operator that the projected pattern of light overlaps the interior edge line. In addition to one or more of the features described herein, or as an alternative, further embodiments of the method may include the probing device having a six degree-of-freedom (DOF) tactile probe. In addition to one or more of the features described herein, or as an alternative, further embodiments of the method may include the probing device having a six degree-of-freedom (DOF) triangulation scanner. In addition to one or more of the features described herein, or as an alternative, further embodiments of the method may include the probing device having an articulated arm coordinate measuring machine having a tactile probe. In addition to one or more of the features described herein, or as an alternative, further embodiments of the method may include the probing device includes an articulated arm coordinate measuring machine having a triangulation scanner. In addition to one or more of the features described herein, or as an alternative, further embodiments of the method may include the probing device having a retroprobe.

According to another aspect of the disclosure, a method comprises: establishing a reference artifact that includes an inscribed pattern, the inscribed pattern being inscribed into a surface of the reference artifact, the reference artifact further including a collection of reflective markers; with a three-dimensional (3D) measuring system, measuring 3D coordinates of the inscribed pattern and 3D coordinates of the collection of reflective markers, the 3D measuring system including a laser tracker, a probing device, and a retroreflector coupled to the probing device; with a light projector, measuring angles to the collection of reflective markers; with the light projector, projecting a pattern of light onto the inscribed pattern, the projected pattern of light based at least in part on the measured 3D coordinates of the inscribed pattern, the measured 3D coordinates of the reflective markers, and the measured angles to the collection of reflective markers; and storing the measured 3D coordinates of the inscribed pattern and the 3D coordinates of the collection of reflective markers.

In addition to one or more of the features described herein, or as an alternative, further embodiments of the method may include verifying by an operator that the projected pattern of light overlaps the inscribed pattern. In addition to one or more of the features described herein, or as an alternative, further embodiments of the method may include the probing device being selected from the group consisting of: a six degree-of-freedom (DOF) tactile probe, a six degree-of-freedom (DOF) triangulation scanner, an articulated arm coordinate measuring machine having a tactile probe, an articulated arm coordinate measuring machine having a triangulation scanner, and a retroprobe.

According to yet another aspect of the disclosure, a method comprises: establishing a reference artifact that includes a marked pattern, the marked pattern being drawn on a surface of the reference artifact or inscribed into the surface of the reference artifact, the reference artifact further including a collection of reflective markers; at each of three or more camera poses, capturing with a camera an image of the marked pattern, the collection of reflective markers, and at least one reference length having a reference-length value; determining with a processor 3D coordinates of the collection of reflective markers and 3D coordinates of the marked pattern based at least in part on the three or more camera images and on the at least one reference-length value; with a light projector, measuring angles to the collection of reflective markers with the light projector, projecting a pattern of light onto the marked pattern, the projected pattern of light based at least in part on the measured 3D coordinates of the marked pattern, the measured 3D coordinates of the reflective markers, and the measured angles to the collection of reflective markers; and storing the measured 3D coordinates of the marked pattern and the 3D coordinates of the collection of reflective markers.

In addition to one or more of the features described herein, or as an alternative, further embodiments of the method may include verifying by an operator that the projected pattern of light overlaps the marked pattern.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 3I is an isometric view of a TrackArm system according to an embodiment;

The detailed description explains embodiments of the disclosure, together with advantages and features, by way of example with reference to the drawings.

DETAILED DESCRIPTION

Embodiments of the present invention provide for a system and method that allows creation and calibration of a reference artifact in house. The term "in house" as used here means that the reference artifact is created or calibrated by the user rather than by the manufacturer of the light projector device. Such a reference artifact may be different than artifacts available from a manufacturer and may include materials found within a user facility and not available in a commercially purchased artifact. Embodiments of the present invention provide for a system and method that further allows for visual verification of the accuracy of a laser projection device over a relatively large measurement volume. Further embodiments of the present invention provide a way to obtain a traceable calibration of the performance of a laser projector without returning an artifact to a calibration laboratory for testing.

Figure 1A:
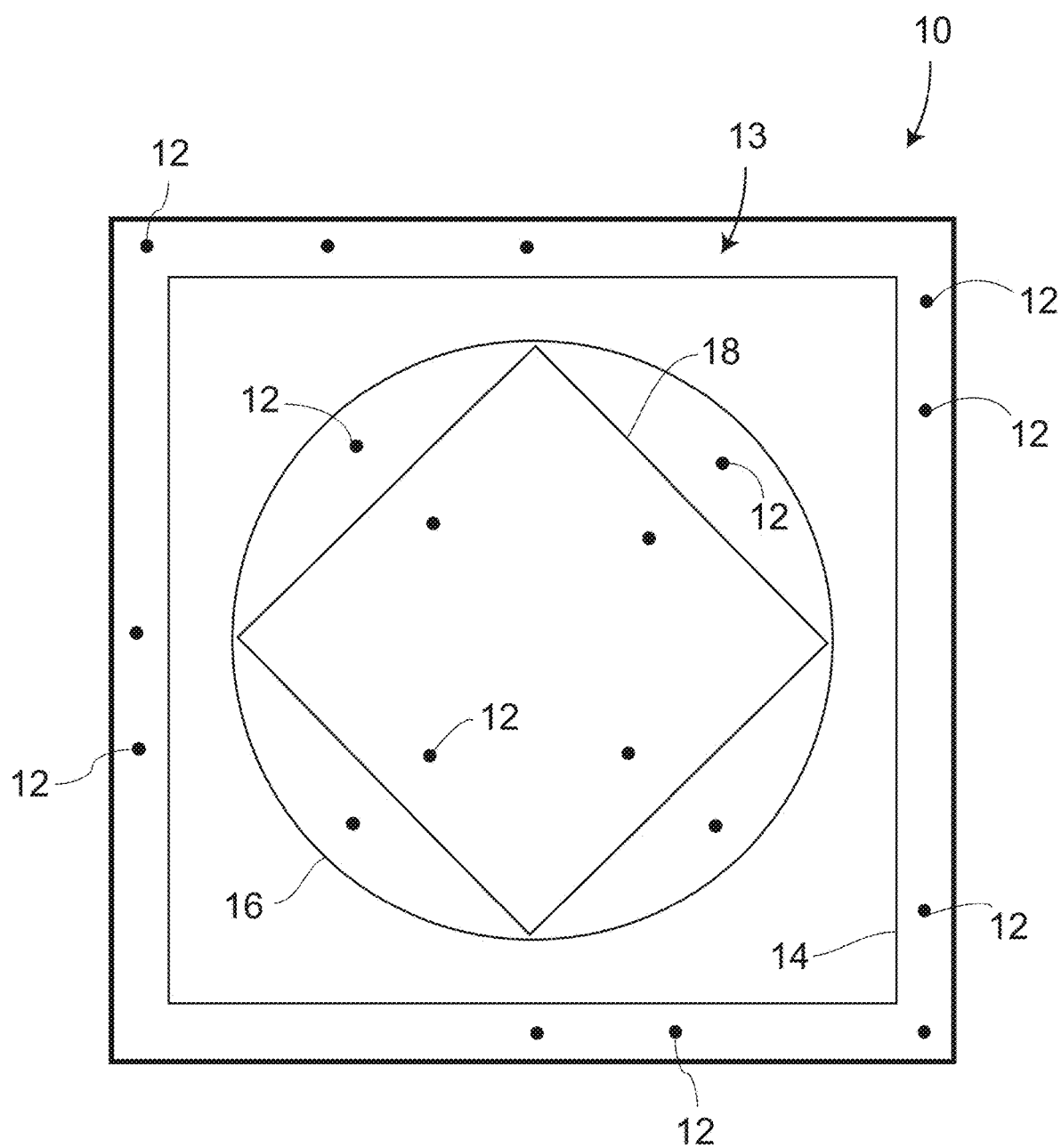
FIG. 1A is a front view of a prior art artifact for visually verifying a light projection.
Figure 1C:
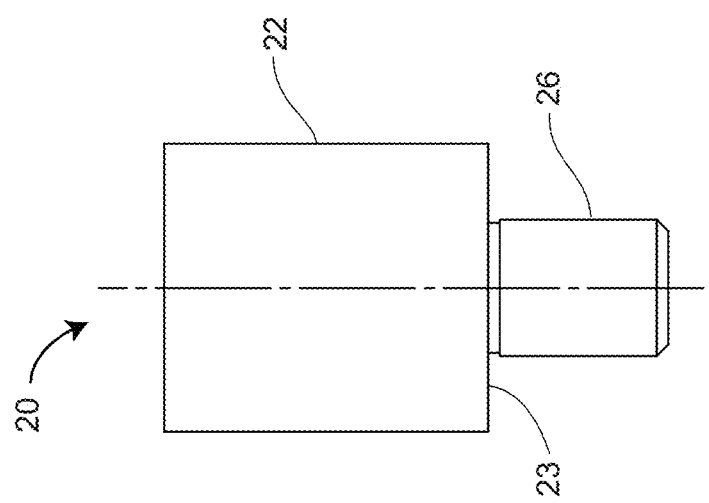
FIG. 1B and FIG. 1C are isometric and side views, respectively, of a reflective marker according to an embodiment.
Figure 1B:
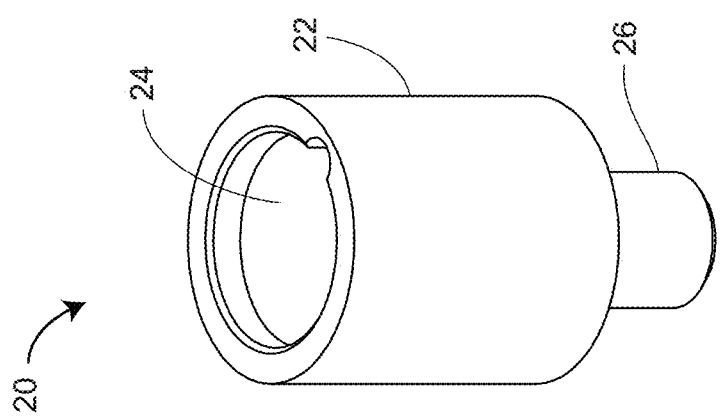

FIGS. 1B, 1C illustrate a reflective marker 20, which is an example of a particular type of reflective marker 12 in FIG. 1A. In an embodiment, the reflective marker 20 includes a body 22, a flat reflector element 24, and a shank 26. In an embodiment, the shank 26 is sized to fit into a bushing that fits into a hole drilled into a surface of the artifact 10. In an embodiment, the bushing is positioned so that the top surface of the bushing is at a known level relative to the flat surface of the artifact 10. In an embodiment, the flat reflector element 24 is a calibrated distance above the bottom contact surface 23 of the body. In an embodiment, a 3D measuring instrument such as an articulated arm coordinate measurement machine (AACMM) 100 discussed below in relation to FIG. 1D or a laser tracker 300 discussed below in relation to FIG. 3A. In an embodiment, the AACMM 100 likewise uses a tactile probe with a sharp probe tip to measure the 3D coordinates of the engraved pattern 13.

Figure 1D:
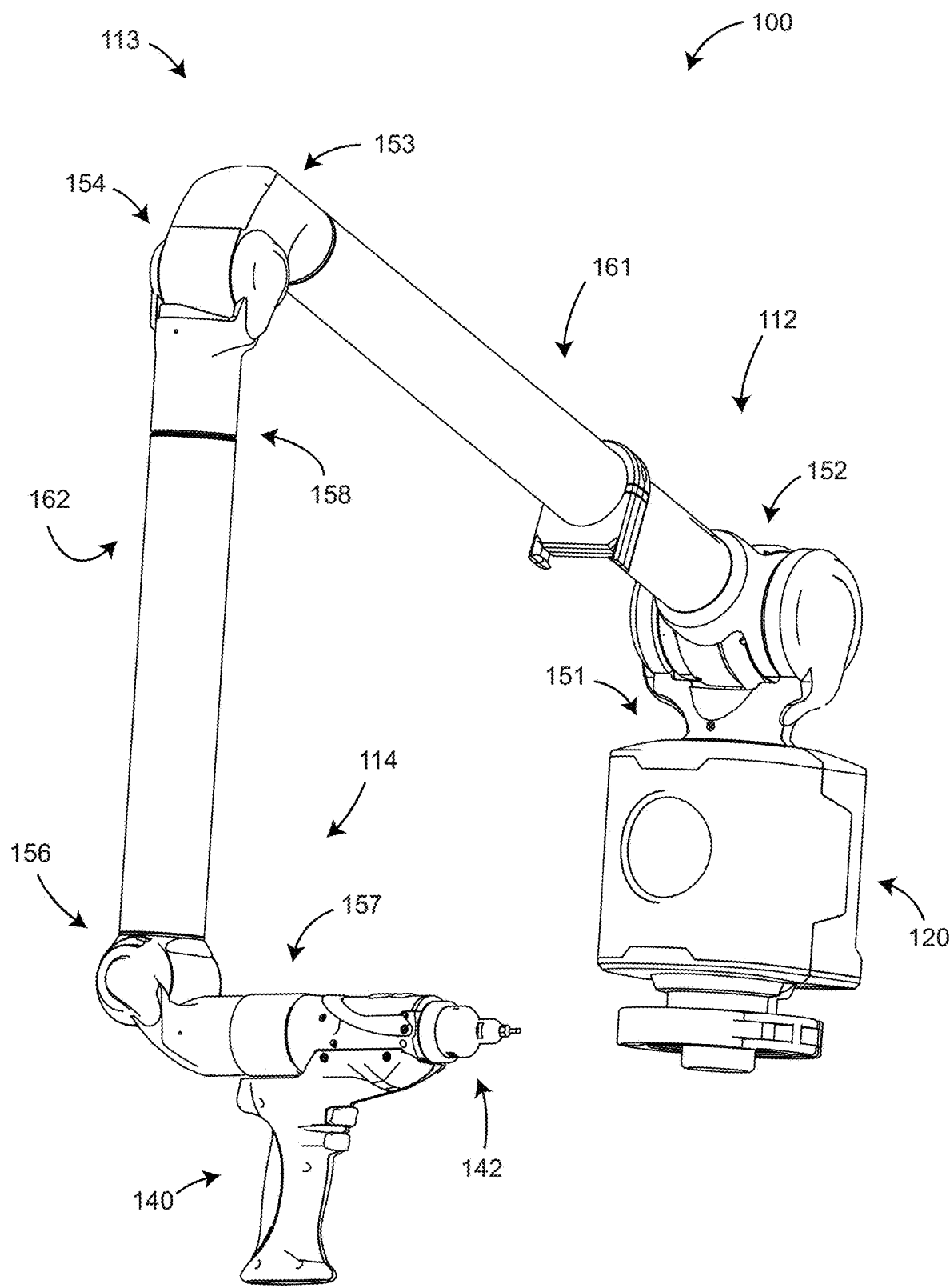
FIG. 1D is an isometric view of an articulated arm coordinate measurement machine (AACMM)

FIG. 1D illustrates an exemplary AACMM 100 that includes a base 120, a first (swivel) axis 151, a second (hinge) axis 152, a first arm segment 161, a third (swivel) axis 153, a fourth (hinge) axis 154, a fifth (swivel) axis 158, a second arm segment 162, a sixth (hinge) axis 156, a seventh (swivel) axis 157, a measurement probe, which in the example shown is a tactile probe 142, and a handle 140. The articulated arm resembles in its function a human arm and so is said to include a shoulder 112, an elbow 113, and a wrist 114. Each of the axes of the arm includes an angular encoder that measures angles to relatively high accuracy, thereby enabling determination of a probe tip of the tactile probe 142 to relatively high accuracy.

Figure 1E:
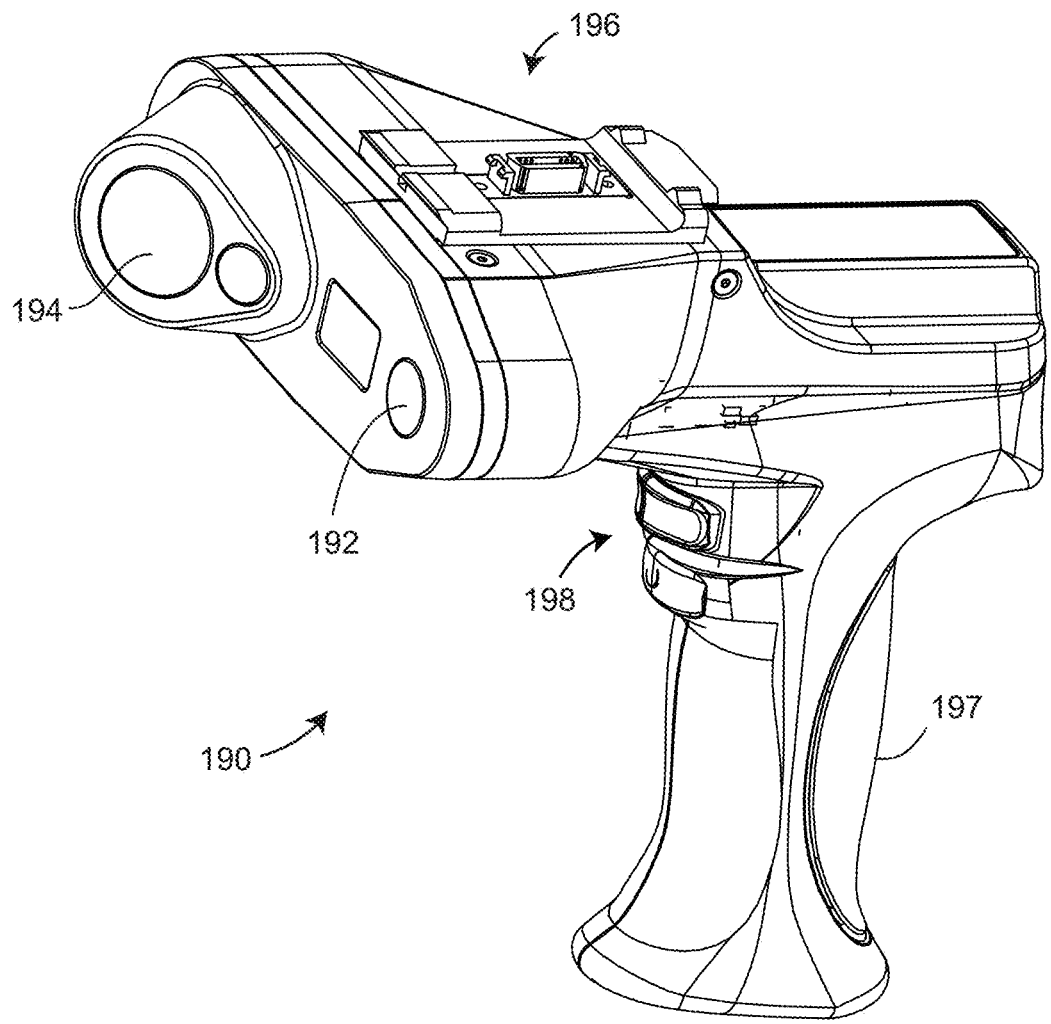
FIG. 1E is an isometric view of a laser line probe (LLP)

FIG. 1E illustrates a laser line probe (LLP) 190, also referred to as a line scanner, which may be attached to the AACMM 100 through a mechanical and electrical connector 196 in substitution for the handle 140. In an embodiment, the LLP 190 includes a line projector 192, a camera 194, a handle 197, and buttons (actuators) 198. The LLP sends a line of line from the projector 192 onto an object. The light is imaged by a two-dimensional (2D) camera 394. Triangulation is used to determine 3D coordinates of the object points intersected by the projected line based at least the projected light, the captured image and the triangulation geometry of the LLP 190.

In an embodiment, the probe tip of the tactile probe 142 is used to measure the 3D coordinates of the reflective marker 12 and of the engraved pattern 13. In another embodiment, an LLP 190 is used to measure the 3D coordinates of the reflective markers 12 and the engraved pattern.

Figure 2A:
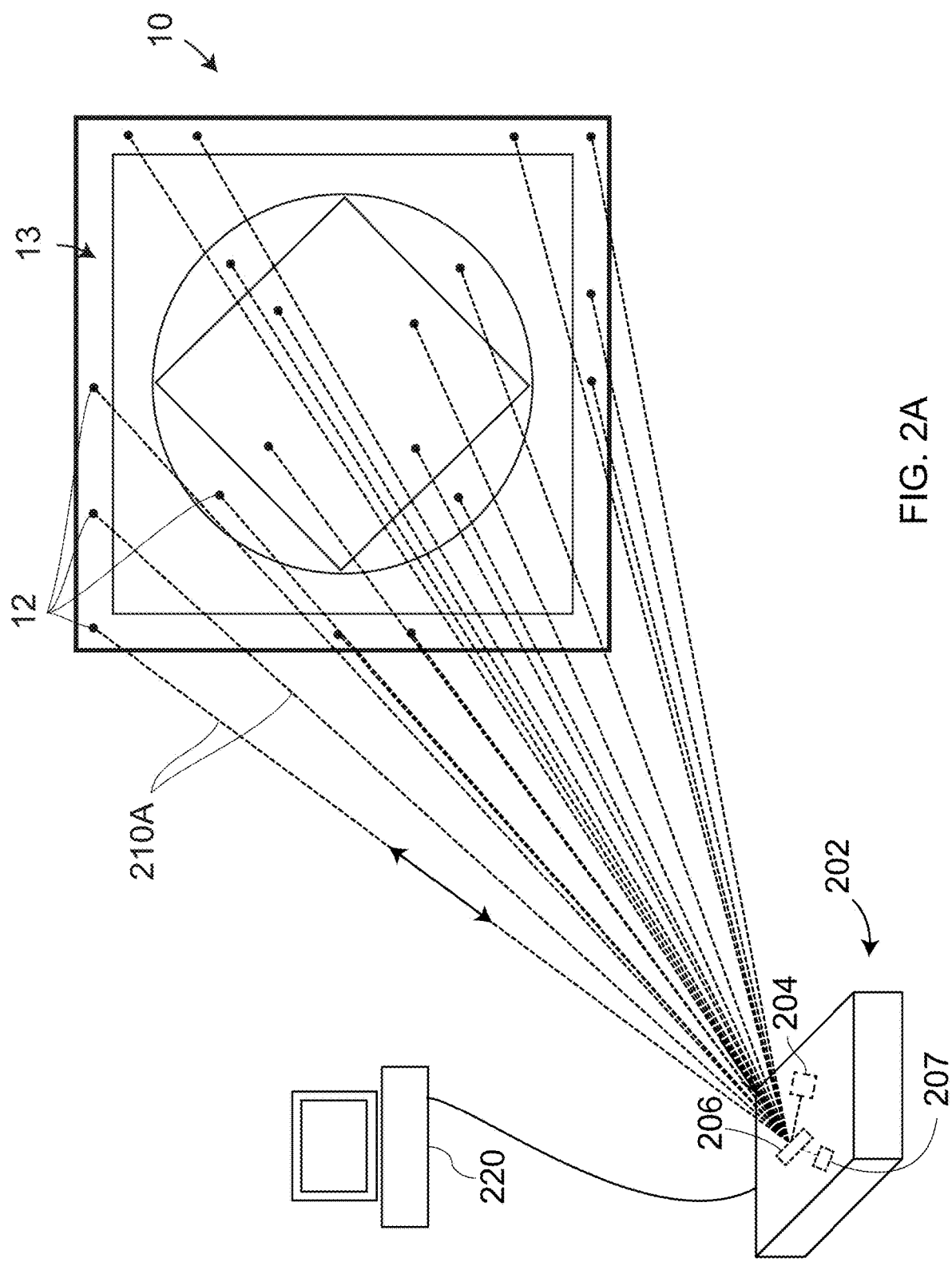
FIG. 2A is a schematic illustration of a light scanner used in conjunction with a processor to measure the position of retroreflector targets on the artifact.

FIG. 2A shows a light projector 202, which includes a light source 204, a beam steering mechanism 206, and an optical detector 207. The light projector 202 projects light 210A toward the artifact 13 or other object and receives reflected light returned along the same path. An image of the light striking the artifact 13 may be generated by a processor, such as the processor 220, based on the optical power received by the optical detector 207 as a function of the projection angle of the light 210A. An angle measuring mechanism enables a determination of the angles of the projected light directed to the reflective markers 12. A more detailed description of an exemplary light projector is given in reference to FIG. 2C. The processor 220 may be a processor that is internal to the light projector 202.

Figure 2B:
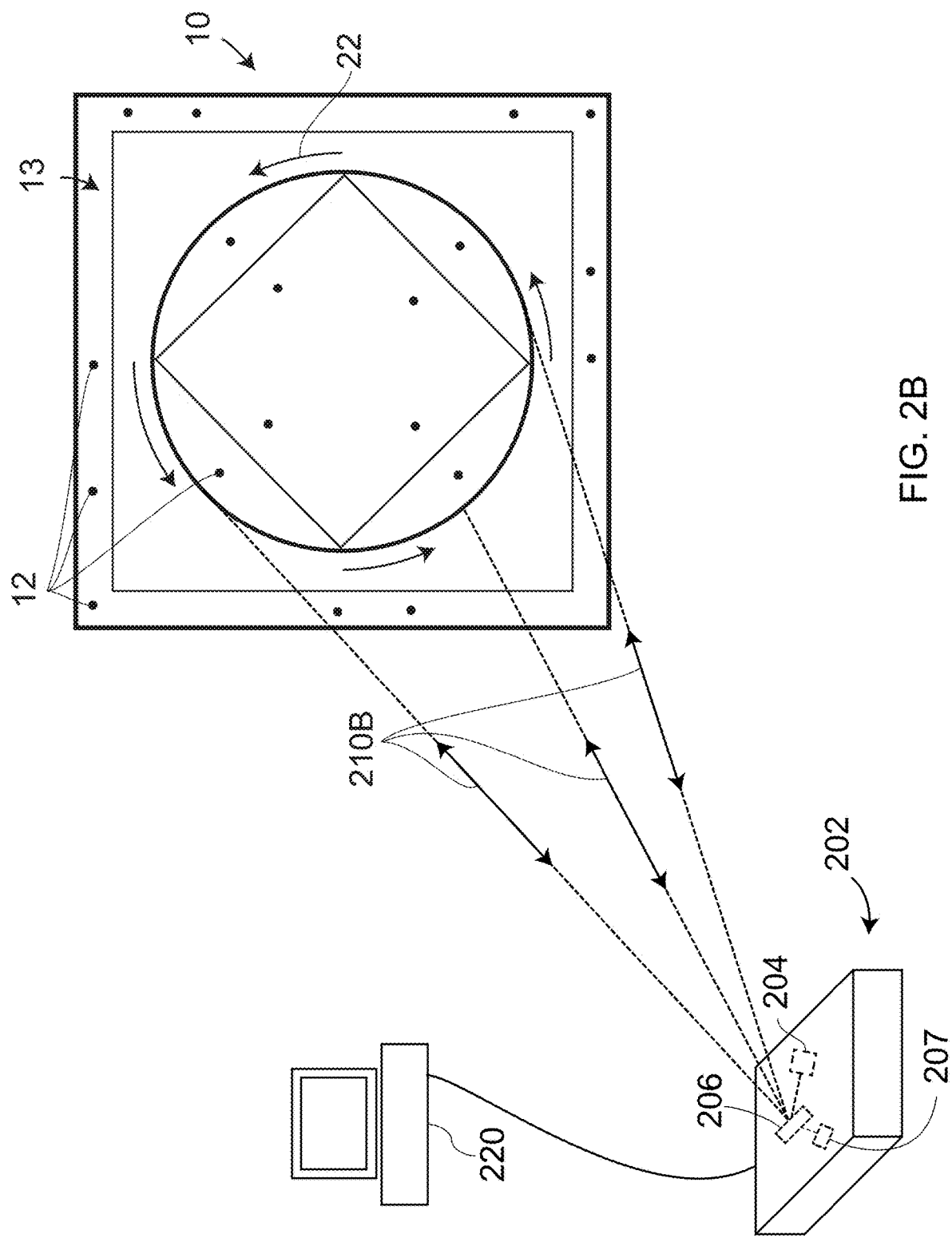
FIG. 2B is a schematic illustration of a light scanner used to project onto the artifact a prescribed pattern.

FIG. 2B shows the light projector 202, now projecting light along the inscribed pattern 13. The light projector 202 and any associated processors 220 determine the pose of the artifact 10, which is to say that the processors 220 determine the six degrees-of-freedom of the artifact 10 in the frame-of-reference of the light projector 202 based at least in part on the angles to each of the reflective markers 12. The angles to the reflective markers 12 may be determined based on measurements performed by the light projector 12 as illustrated in FIG. 2A. In an embodiment, the light projector 202 generates a light pattern on the surface of the artifact 10 by rapidly moving the laser beam with the steering mechanism 206 in a rapid repeated manner. The result is to create the appearance to the human eye of a continuously illuminated pattern of light. In an embodiment, an operator views the projected light and confirms that the light falls within prescribed limits on the inscribed pattern 13. If the light does not fall within the prescribed limits, the light scanner may be re-compensated or repaired. Re-compensation may be performed using compensation procedures either performed solely by the operator, performed by an operator with the use of collaborative guidance software, or performed automatically via control software.

Figure 2C:
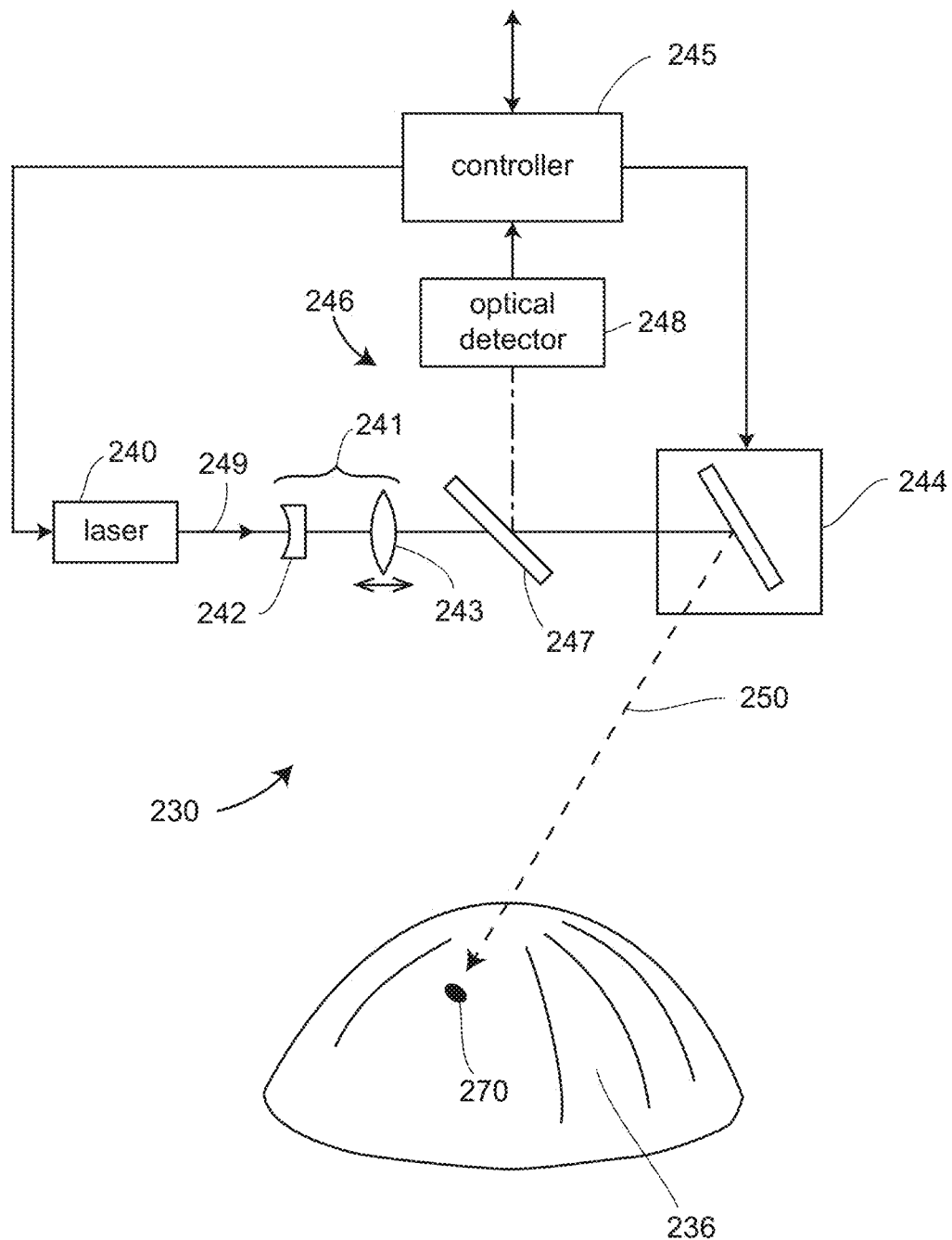
FIG. 2C is a schematic illustration of a light scanner projecting light onto an object according to an embodiment.

FIG. 2C shows a light projector 230, which is one possible embodiment of the laser projector 202. The exemplary light projector 230 includes a laser 240, a focusable beam expander 241 having a negative lens 242 and a positive lens 243, a beam steering system 244, a controller 245, and an optical feedback subsystem 246 having a pickup element 247 and an optical detector 248.

The laser 240 emits a laser beam 249. In some embodiments, the laser 240 is implemented with a solid state diode pumped laser that produces light at the "green" wavelength of 532 nanometers, although other wavelengths may be used. In some cases, the beam 249 is a continuous wave (cw) beam having an optical power not exceeding 5 milliwatts, which makes it a class IIIa laser beam. Parameters such as wavelength, power, beam shape, and diameter of the beam 249 vary in different embodiments. In some embodiments, the beam 249 comes from a non-laser light source. In an embodiment, the laser 240 is turned on and off by the controller 245 during scanning and projection operations of the light projector 230. In some cases, the beam 249 has a diameter of around 0.4 to 1.0 millimeters. In some embodiments, the beam expander 241 expands the laser beam 10 to 15 times. The combination of lenses 242, 243 may function as a focusable beam collimator to focus the projector beam 250 onto the surface 236 of an object. In some embodiments, the positive lens 243 is mounted on a slide (not shown) moved manually or automatically along its optical axis to re-focus the output beam 250 according to the distance from the projector 230 to the surface 236.

Figure 2D:
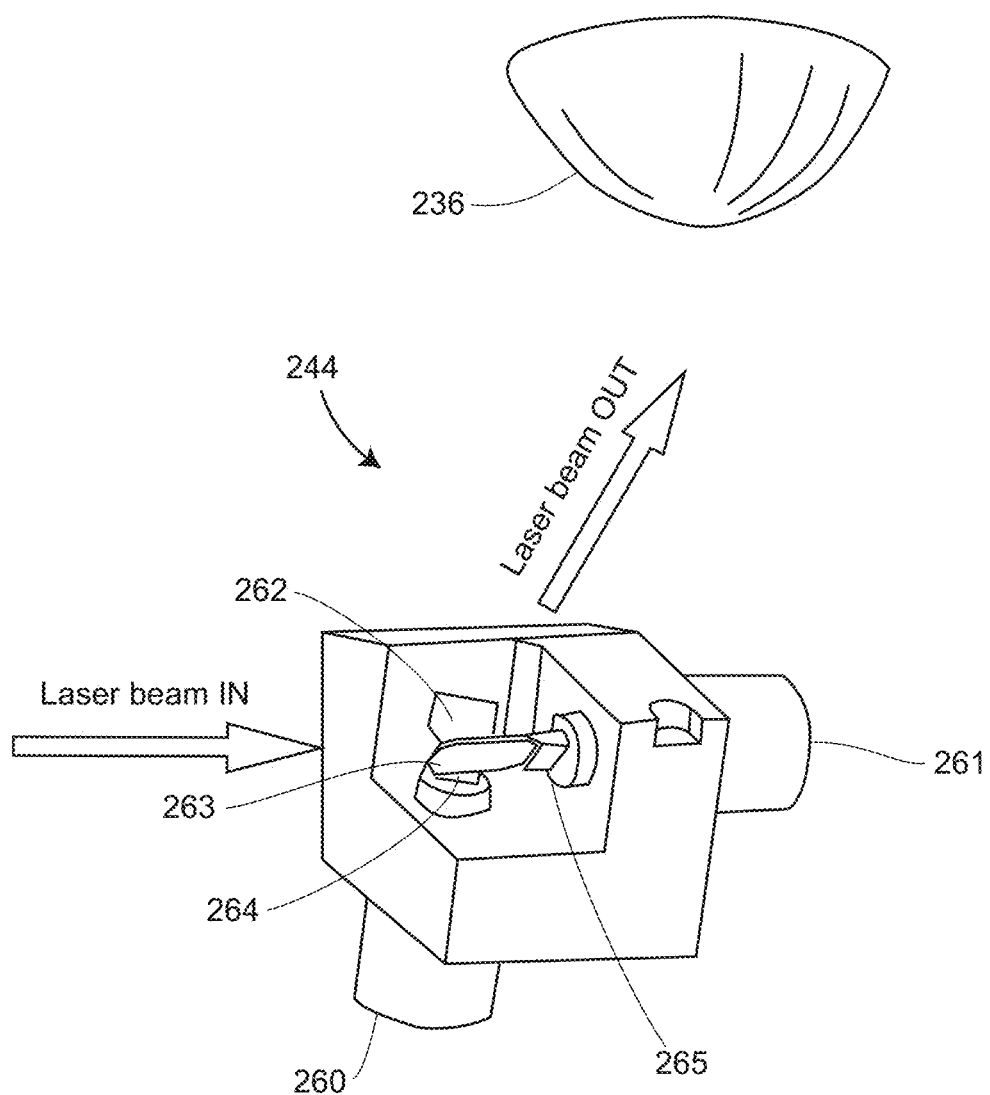
FIG. 2D is galvanometer steering mechanism according to an embodiment.

The exemplary beam-steering system 244 in FIG. 2D is a two-axis galvanometer based system. The system 244 includes galvanometers 260, 261, beam steering mirrors 264, 265 mounted on coupling clamps 264, 265 of the shafts of the galvanometers 260, 261. The galvanometers are high precision servo motors containing angular position sensors. Exemplary galvanometers that can be used in various applications for laser projection include, for example, models 6860 or 6220 made by Cambridge Technology, Inc., USA.

In the process of light projection in accordance with such embodiments, the controller 245 moves the galvanometers 260, 261 in a coordinated manner. Light emitted by the laser 240 strikes, at first, mirror 262, which steers the laser beam horizontally (H angle). The light next strikes mirror 263, which steers the laser beam vertically (V angle) and directs it toward the object surface 236. In one exemplary configuration, at a distance of about 5 meters from the projector to the object surface 236, the spot 250 has a diameter of about 0.3 to 1 millimeter. If the laser beam strikes the surface 236 orthogonally, the shape of the spot 270 is circular. Otherwise, the shape of the spot on the surface is elliptical. In an embodiment, the optical feedback pickup element 247 in FIG. 2C is implemented as a beam splitter having a transmission-to-reflection ratio of between 50:50 and 90:10. A ratio of 90:10 may be advantageous in some instances because the projected laser light is relatively brighter when striking the surface 236.

Figure 3A:
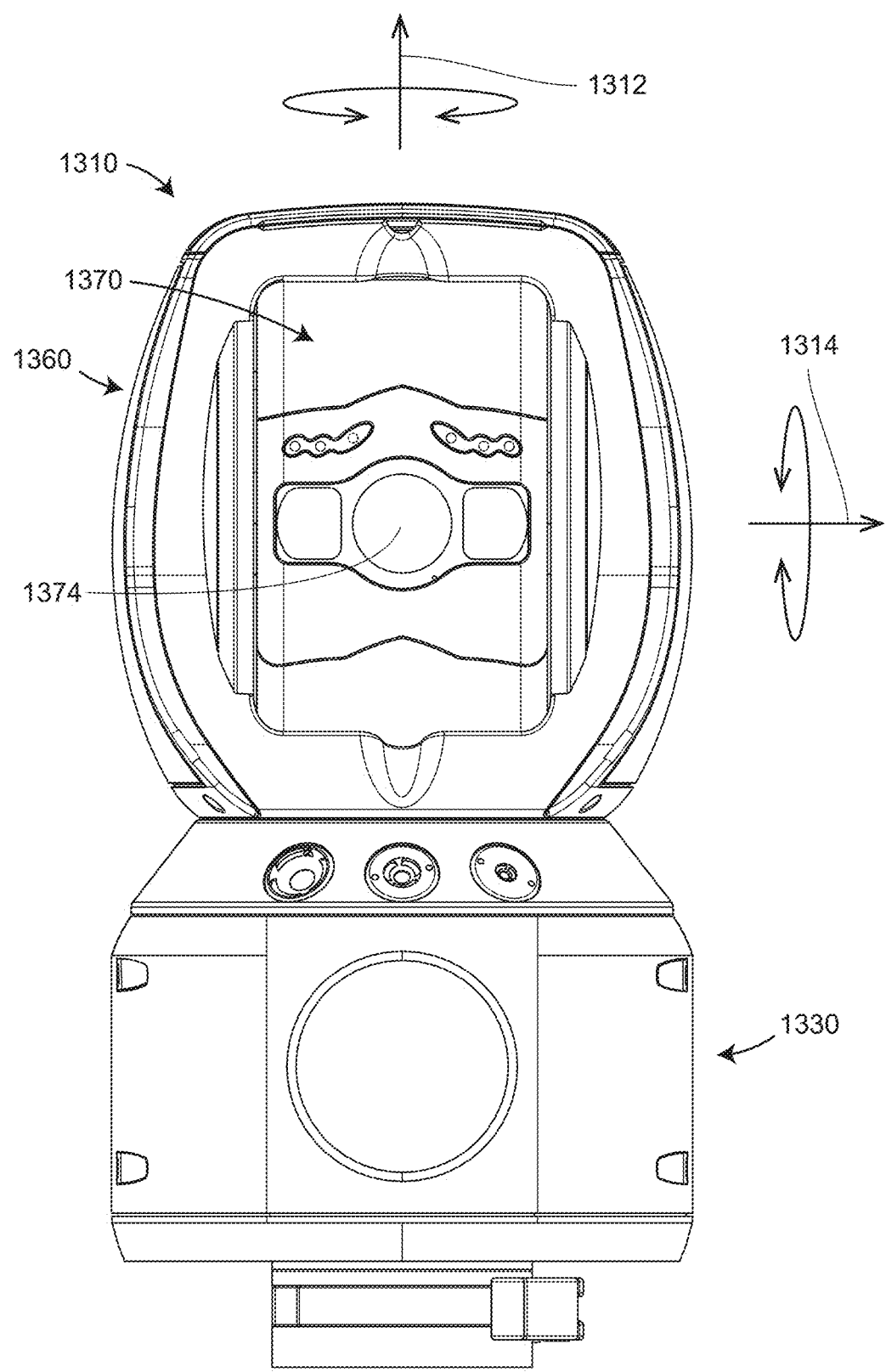
FIG. 3A is a front view of a laser tracker.

FIG. 3A is a front view of an exemplary laser tracker 1310. The base assembly 1330 is ordinarily stationary with respect to a work area. For example, the base may be mounted on an instrument stand or an industrial tripod. The yoke assembly 1360 rotates about an azimuth axis 1312, which is sometimes referred to as a standing axis or a vertical axis. It should be appreciated, however, that the laser tracker 1310 may, in general, be positioned upside down or be rotated to an arbitrary angle with respect to a floor. The payload assembly 1370 rotates about a zenith axis 1314, which is sometimes referred to as a transit axis or a horizontal axis.

Figure 3D:
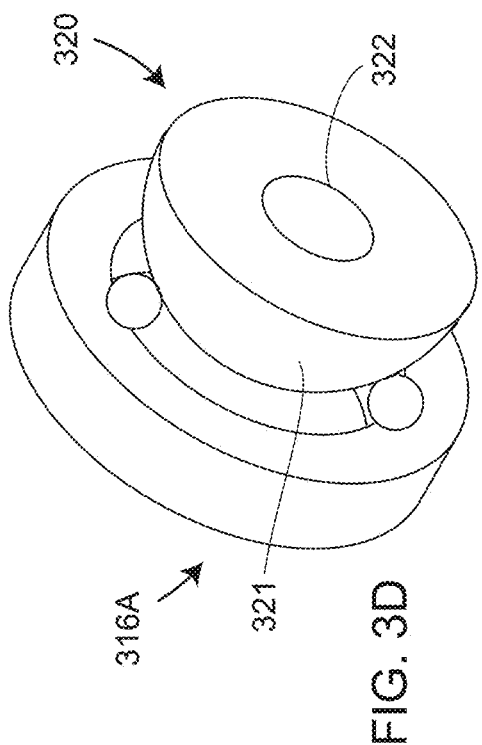
FIGS. 3B, 3C, 3D are isometric views of a kinematic nest, a spherically mounted retroreflector (SMR) in the nest, and a hemispherical reflector in the nest according to an embodiment.
Figure 3C:
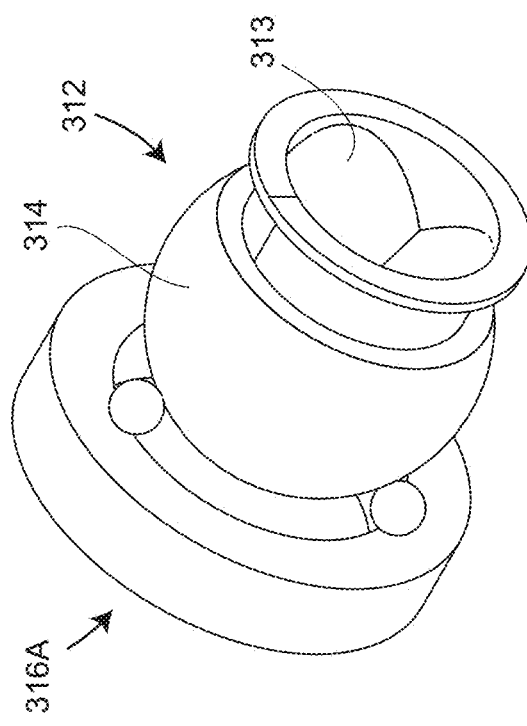

The laser tracker 1310 sends outgoing light through an exit aperture 1374 to a retroreflector such as the spherically mounted retroreflector (SMR) 312 shown in FIG. 3C. In one type of SMR 312, a cube-corner retroreflector 313 is embedded inside an element having a spherical surface 314, with a vertex of the cube-corner retroreflector 313 centered on the spherical surface 314. An exemplary laser tracker 310 in FIG. 4A sends a beam of light 311 to a retroreflector 408 included in a probing system 400, and light reflected by the retroreflector is returned to the laser tracker 310 along the reverse path of the beam 311.

The laser tracker 1310 includes a distance meter such as an absolute distance meter (ADM) or an interferometer. These types of distance meters base the distance travelled from the laser tracker to the retroreflector based at least in part on the speed of the emitted light in air. As such the measured distance depends on the temperature and barometric pressure of the air through which the beam of light passes. The laser tracker 1310 also includes angle transducers such as angular encoders to measure the angles of rotation about the vertical axis 1312 and the horizontal axis 1314. Using the measured distance and the measured horizontal and vertical angles, the laser tracker 1310 determines the 3D coordinates of the retroreflector.

Figure 3B:
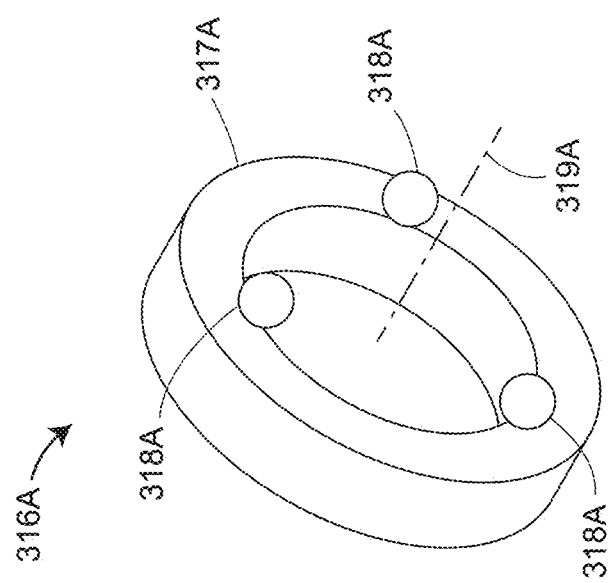

An accessory often used with a laser tracker 1310 is a kinematic nest such as the nest 316A shown in FIGS. 3A, 3B, 3C. An exemplary kinematic nest includes three spheres 318A to which the spherical surface 314 of the SMR 312 is held in contact. The kinematic nest 316A has the property that the SMR may be repeatedly removed and replaced on the nest without changing the position of the SMR vertex in 3D space. In an embodiment, the kinematic nest 318A also includes a magnet to hold the SMR 312 in firm contact with the three spheres 318A. Other types of kinematic nests besides that shown in FIG. 316A are also possible.

A kinematic nest 316A may also be used to hold a reflector hemisphere 320 that includes a reflective marker 322 mounted on a hemisphere having a spherical surface 321. If the radius of the spherical surface 321 of the hemisphere 320 is the same as the radius of the spherical surface 314 of the SMR 312, then the center of the marker 322 has the same 3D coordinates of the vertex of the SMR 312.

Figure 3F:
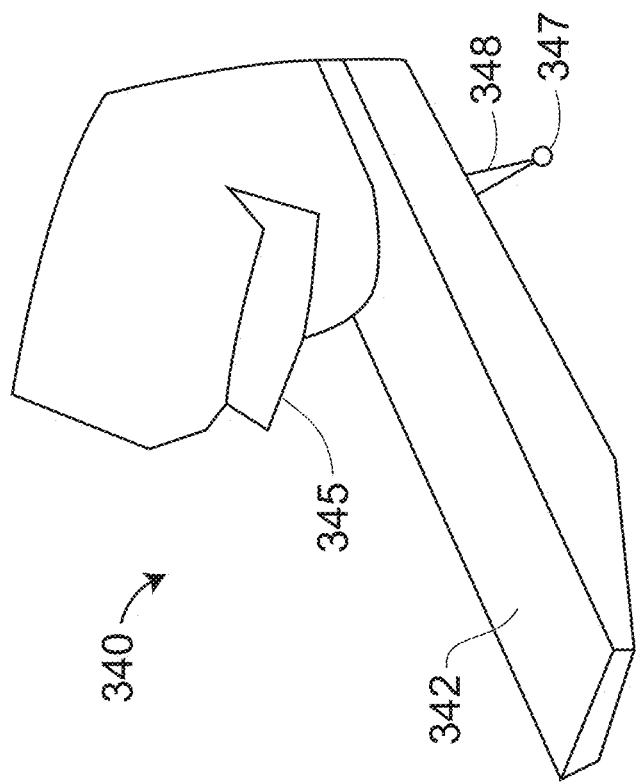
FIG. 3F is a perspective view of a retroprobe according to an embodiment.
Figure 3E:
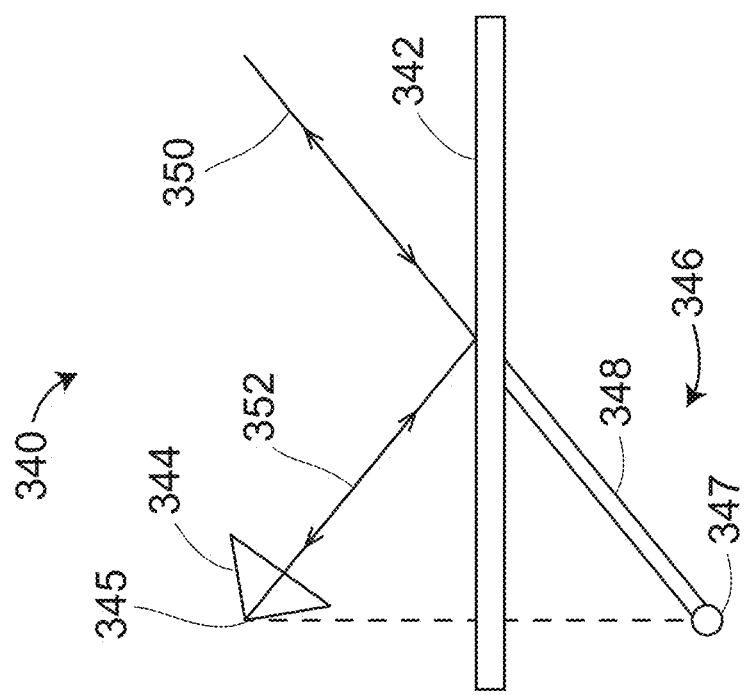
FIG. 3E is a schematic illustration of the principle of operation of a retroprobe according to an embodiment.

Another type of targeting accessory that may be used with a laser tracker 1310 is a retroprobe such as the retroprobe 340 in FIGS. 3D, 3E. A retroprobe is characterized by having a tactile probe tip able to measure a hidden point (i.e., a point that cannot be reached with the beam of light from the laser tracker) by placing the probe tip at a virtual image of a retroreflector vertex point. FIG. 3E shows a schematic representation of the retroprobe 340 to facilitate explanation of the principle of operation, while FIG. 3F shows hardware in an exemplary retroprobe 340. The surface 342 is a first surface mirror. Light 350 arrives from the laser tracker, reflects off the mirror 342 as a beam 352 to the vertex 345 of a retroreflector 352, which may be a cube-corner retroreflector. On the opposite side of the mirror 342 is positioned a tactile probing assembly 346, which includes a stylus 348 and a probe tip 347. The probe tip 347 is placed at the virtual image point of the retroreflector vertex 345. The virtual image point is placed opposite the front surface of the mirror, with the optical path distance from the mirror to the vertex 345 equal to the optical path difference from the mirror surface to the center of the probe tip 347. In some embodiments, the probe tip 347 is very small or has a sharp point for performing measurements on small features.

Figure 3H:
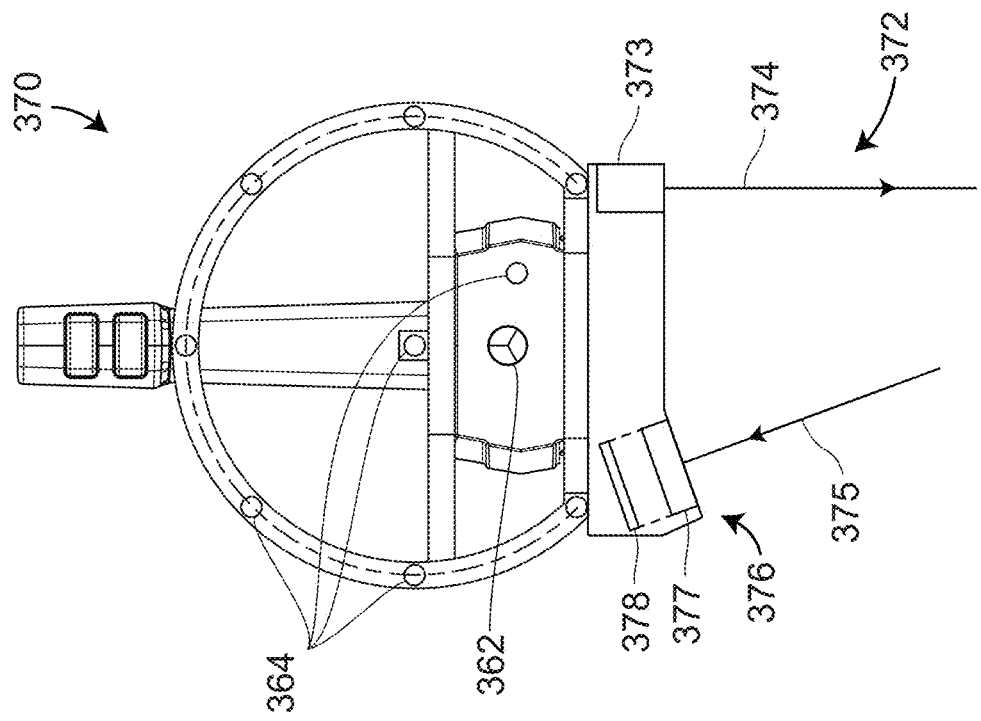
FIG. 3H is a front view of a six-DOF triangulation scanner according to an embodiment.
Figure 3G:
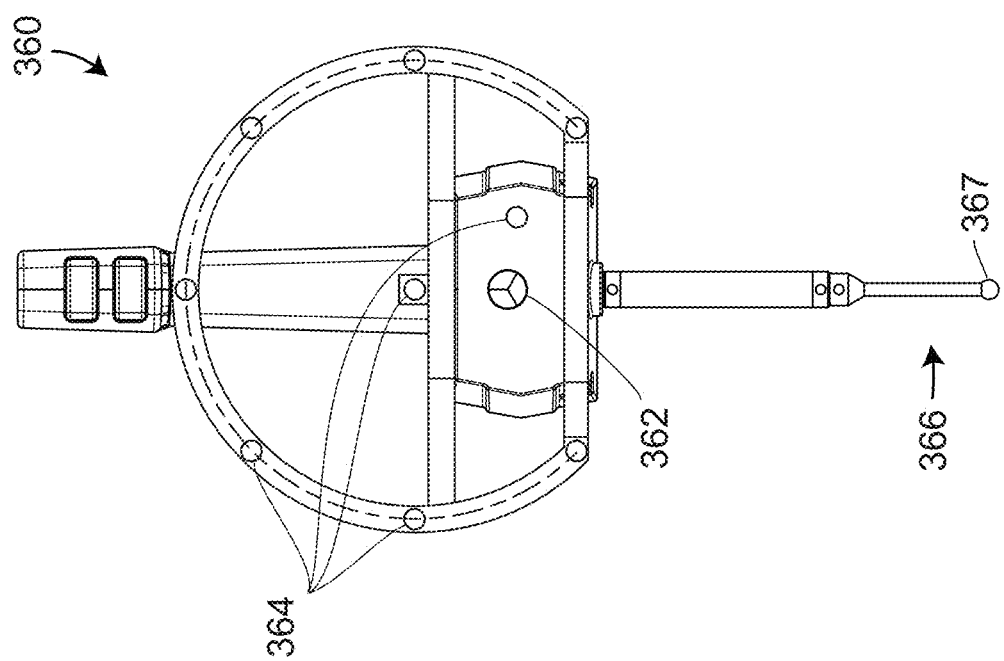
FIG. 3G is a front view of a six degree-of-freedom (six-DOF) tactile probe used with a laser tracker, according to an embodiment.
Figure 31:
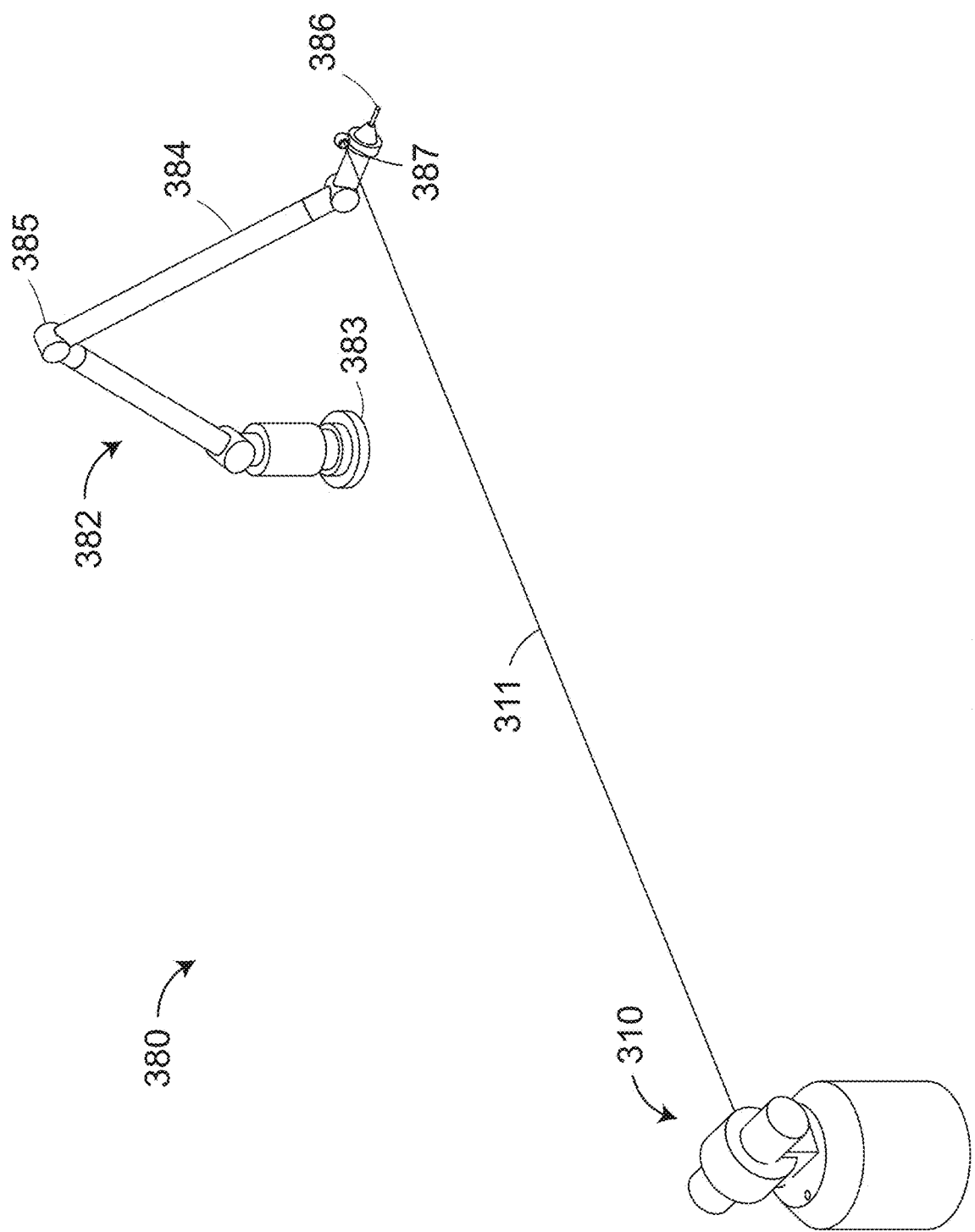

Two more types of targeting accessories used with the laser tracker 1310 are the six degree-of-freedom (six-DOF) tactile probe and the six-DOF triangulation scanner. An exemplary six-DOF tactile probe is the probe 360 of FIG. 3G. An exemplary six-DOF triangulation scanner is the triangulation scanner 370 of FIG. 3H. Many other types of six-DOF tactile probes and six-DOF triangulation scanners are possible. In an embodiment, the six-DOF tactile probe 360 includes a retroreflector 362, a collection of light marks 364, and a probe 366 that includes a probe tip 367. The light marks 364 may be light sources such as light emitting diodes (LEDs) or passive reflective markers that reflect light back to the laser tracker 1310. In an embodiment, a camera within the laser tracker 1310 captures an image of the light marks 364 while the tracker tracks the retroreflector 362 and measures its three translational degrees of freedom (e.g., x, y, z). The tracker uses the imaged light marks to determine the three orientational degrees of freedom (e.g. pitch angle, yaw angle, roll angle) of the six-DOF probe 360. Many other types of six-DOF tactile probes are possible.

In an embodiment, the six-DOF triangulation scanner 370 includes a retroreflector 362, a collection of light marks 364, and a triangulation scanner assembly 372. In an embodiment, the triangulation scanner assembly 372 includes a projector 373 and a camera 376, the projector 373 emitting a light 374 onto an object, the camera 376 receiving the light 375 reflected off the object. In an embodiment, the camera includes a lens systems 377 and a photosensitive array 378, including electronics to process the captured image. The triangulation scanner 372 may be a line scanner or an area scanner. In an embodiment in which the scanner is a line scanner, a beam of light is emitted in a plane. In the embodiment of FIG. 3I, the light is projected in a plane perpendicular to the plane of the paper. In an embodiment, the light be an expanding beam that produces a line of light when intersecting an object. When the scanner 372 is a line scanner, a two-dimensional photosensitive array 378 may be used to capture the line as it illuminates the object. In this case, one axis of the photosensitive array may indicate an angle to the illuminated object spot while the other axis of the photosensitive array may indicate the distance to the illuminated object point. In another embodiment, the triangulation scanner is an area scanner. In an embodiment of the area scanner, the projector 373 emits a two-dimensional pattern of light, with the pattern so designed so as to enable recognition of the pattern elements on the photosensitive array 378 in correspondence to the projected pattern elements. In this way, the matching pattern elements enables a correspondence to be determined between points on a projector plane of the projector 373 and the camera image plane 378. With this correspondence established, a triangulation calculation may be performed to determine 3D coordinates of points on the object. Such a triangulation calculation relies on the relative pose of the projector and camera, including the baseline distance between perspective centers of the projector 373 and the camera 376, to determine the 3D coordinates of the object points. Many other types of six-DOF triangulation scanners are possible.

FIG. 3I illustrates a system 380 that combines a laser tracker 310 and an AACMM 382 to measure coordinates with a probe tip 386. Such a system 380 is sometimes referred to as a TrackArm system. The reason for combining the laser tracker 310 and the AACMM 382 in the TrackArm system 380 is to enable the AACMM 382 to be moved to a variety of different locations, establishing a common frame of reference in each case. In this way, the AACMM 382 is enabled to measure over a much larger measurement volume than would otherwise be possible. In an embodiment, the AACMM includes a base 383, arm segments such as 384, and joints such as 385, which may be swivel joints or hinge joints. In an embodiment, a retroreflector 387 is attached to one of the arm segments. The tracker sends a beam 311 to the retroreflector 387 and measures the 3D coordinates of the retroreflector 387 for the arm segments held in several different configurations. In an embodiment, the 3D coordinates of the retroreflector, as obtained by the laser tracker 310 in each of several arm configurations, is used to determine the pose of the AACMM 382 in relation to the laser tracker 310. This is the same thing as saying that the position and orientation of the AACMM 382 is found within the frame of reference of the laser tracker 310. This procedure of measuring the position of the retroreflector 387 at multiple positions of the arm segments is carried out both before and after the AACMM is moved to a new location. The determined pose before and after moving the AACMM 382 is used to place all the 3D points measured by the AACMM 382 in a common frame of reference.

Figure 4A:
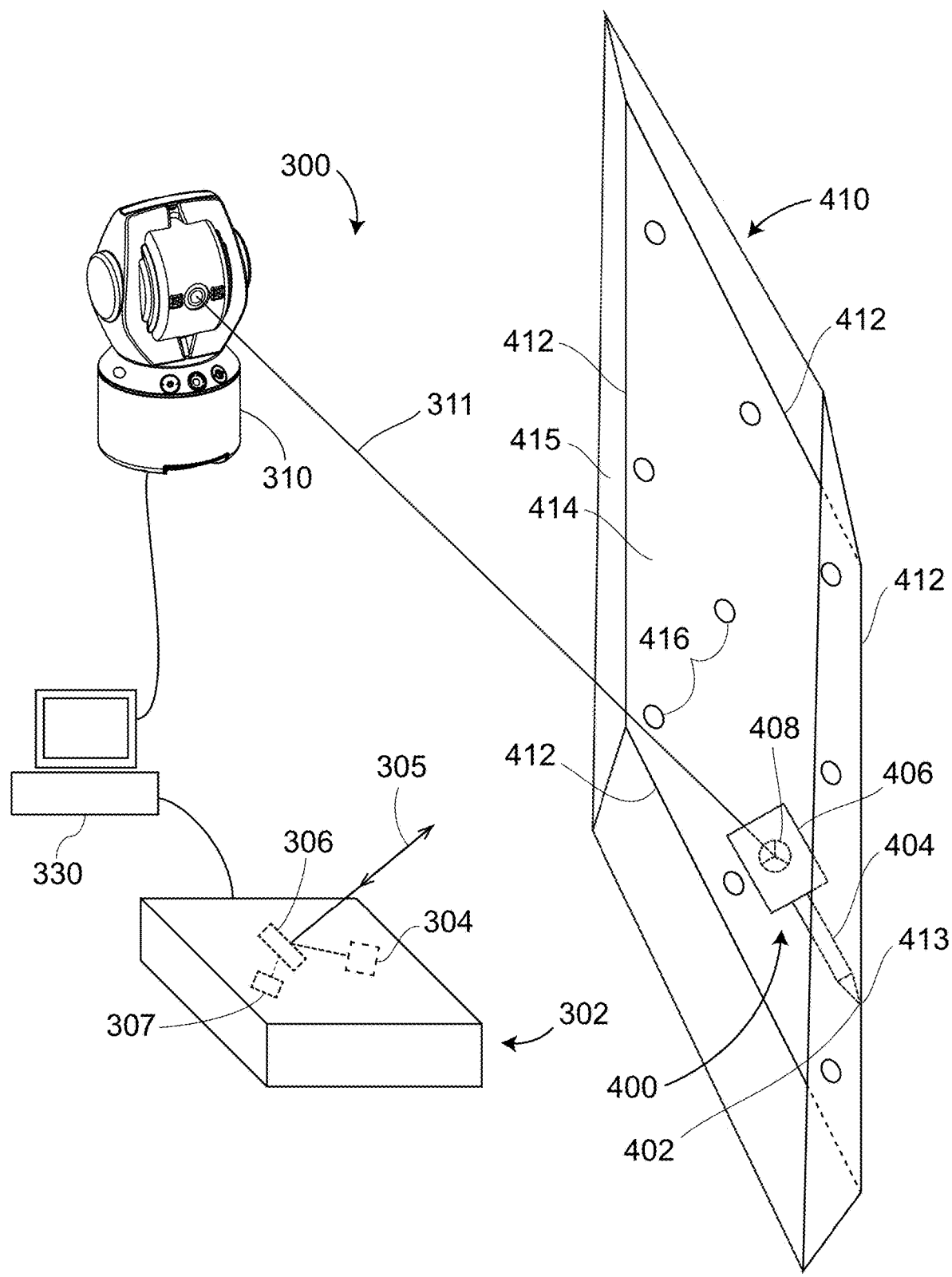
FIG. 4A is an schematic representation of measuring 3D coordinates of interior lines in an artifact with a laser-tracker-based tactile probe according to an embodiment of the present invention.
Figure 4B:
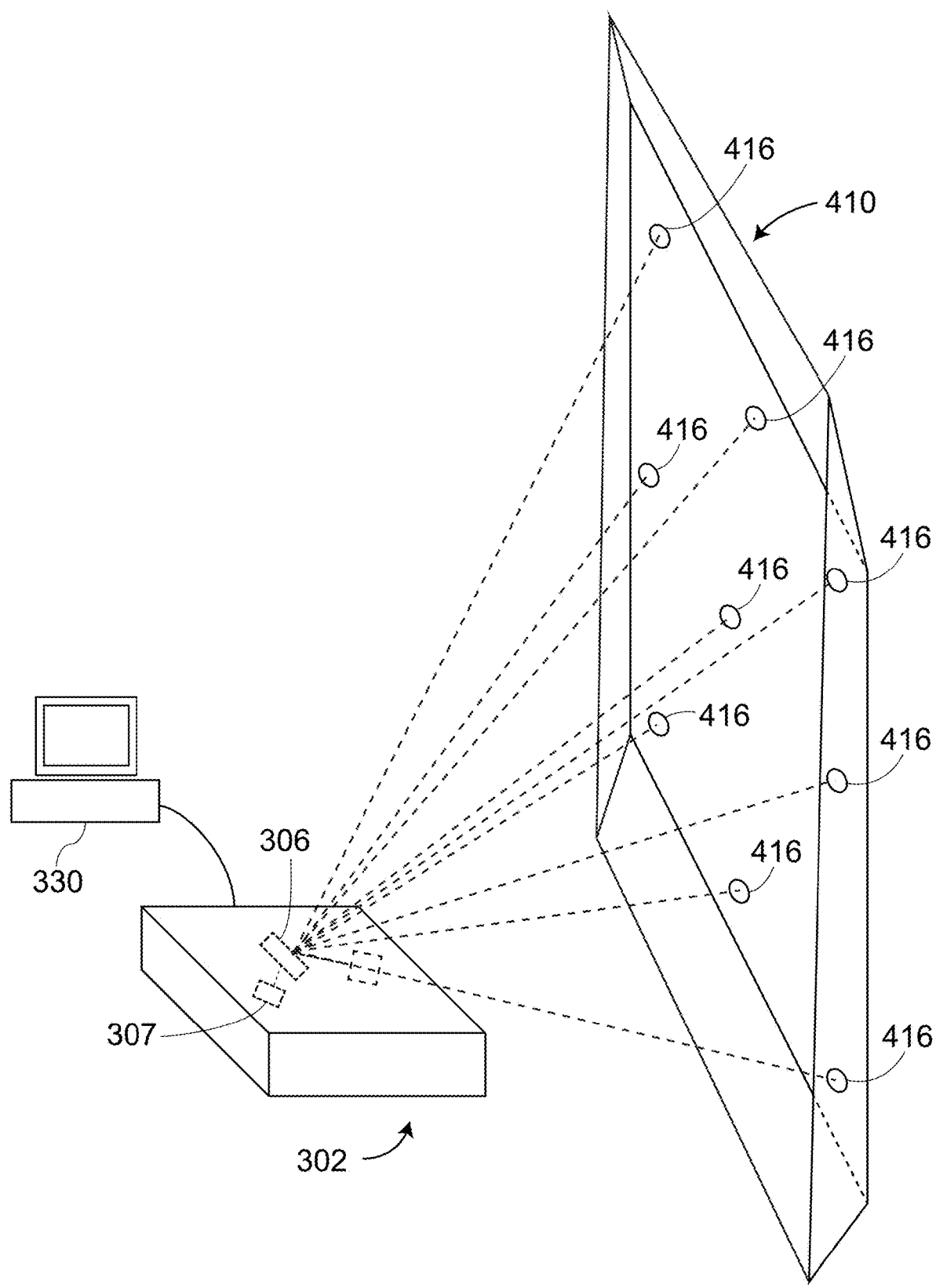
FIG. 4B is a schematic illustration of measuring angles to reflective markers with the light projector according to an embodiment of the present invention.
Figure 4C:
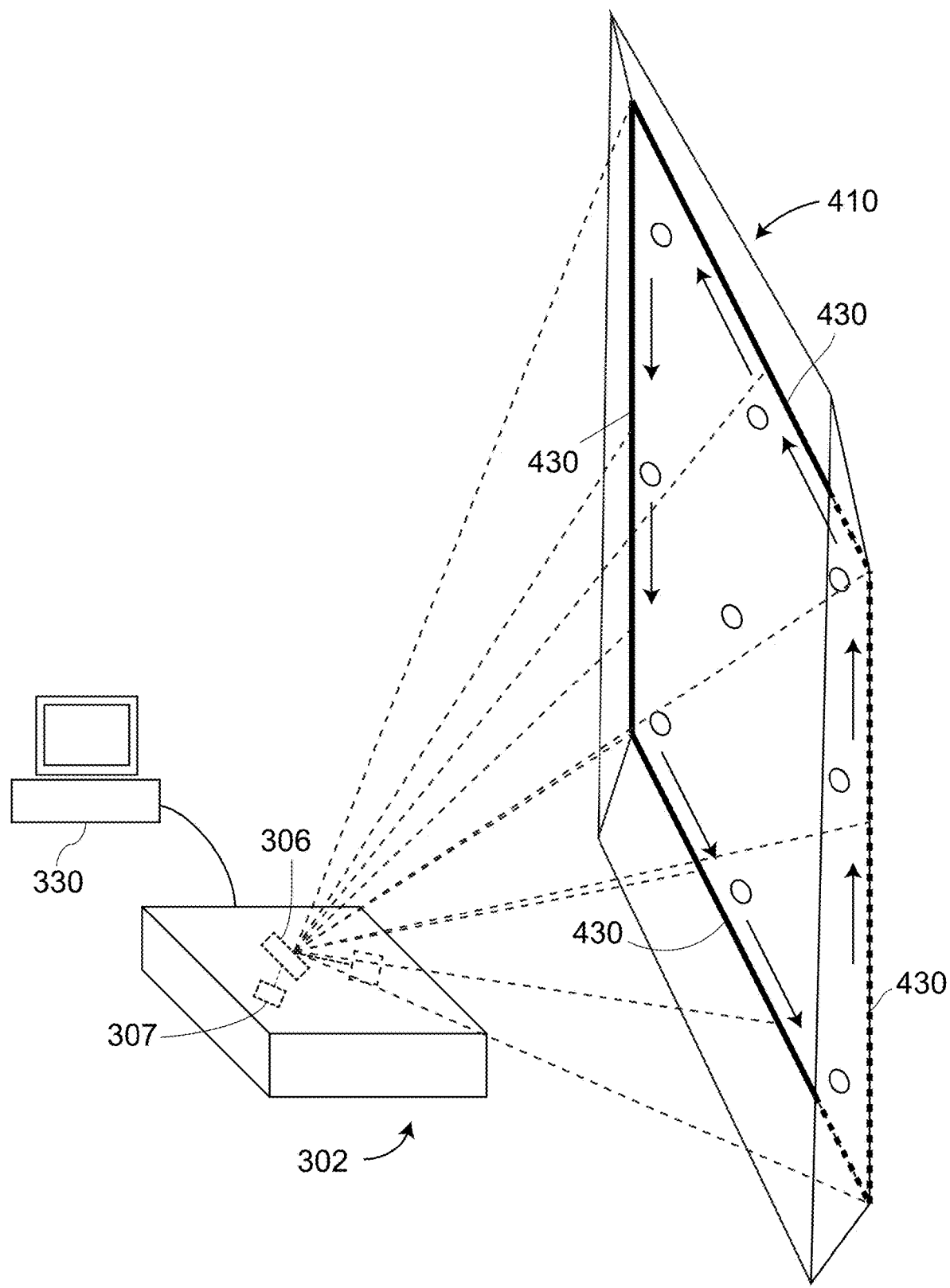
FIG. 4C is a schematic illustration of projecting onto interior intersection lines a pattern of light according to an embodiment of the present invention.
Figure 4D:
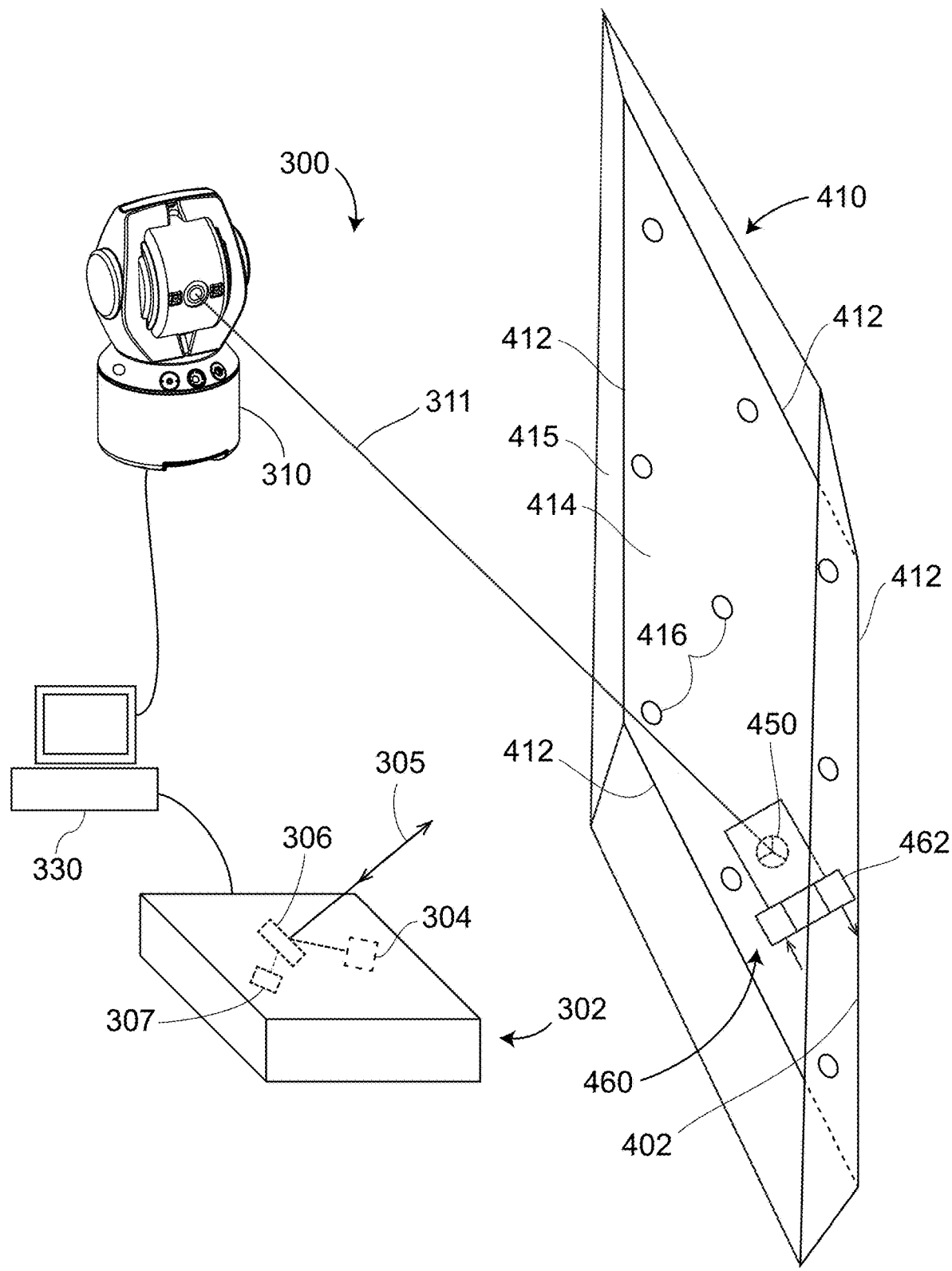
FIG. 4D is a schematic representation of measuring 3D coordinates of interior lines in an artifact with a laser-tracker-based scanner according to an embodiment of the present invention.

FIGS. 4A, 4B, 4C illustrate a method for determining 3D coordinates of an artifact 410 constructed by a user on the user site for verifying the performance of a light scanner 302. In an embodiment, a mechanical structure 410 within a facility includes some interior intersection lines 412. The term "interior intersection line" as used here means a line formed by the intersection of two surfaces 414, 415, the angles between the intersecting surfaces being less than 180 degrees. In an embodiment, a laser tracker 310 is used in combination with a probing system 400 to measure 3D coordinates of points along interior intersection lines 412 and in addition is used to measure the 3D coordinates of reflective markers 416. The probing system 400 includes a retroreflector 408 and a tactile probe tip 413. The probing system 400 may include, but is not limited to, any of the following: a retroprobe such as the retroprobe 340, a six-DOF tactile probe such as the six-DOF tactile probe 360, and an AACMM 382 within a TrackArm system 380. In these three examples, the corresponding tactile probes 346 include probe tips 347, 367, and 386, respectively. In embodiments, the probe tips of the tactile probes 413 may have small probe tip diameters or sharp probe tips. Such small or sharp probe tips enable accurate measurement of 3D coordinates of interior edges.

In an embodiment, the probing system 400 is further used to measure the 3D coordinates of the reflective markers 416. The method of making such measurements with AACMM 113 was discussed herein above in relation to FIG. 1D and may likewise be applied to other types of probing systems 400. In other embodiments, an SMR such as an SMR 312 is used to directly measure the position of the reflective markers. It another embodiment, magnetic nests are placed on the artifact 10, and 3D coordinates of the nest measured with an SMR 312 placed in the nest. These 3D coordinates of the SMR 312 is the same as the 3D coordinates of reflective markers 322 in hemispherical assemblies 320 placed in the same nests 316A, as explained herein above. In another embodiment, a small SMR is mounted on a shank similar to the shank 26 of FIGS. 1B, 1C and the measured coordinates of the small SMR used to determine 3D coordinates of the reflector 24 in FIG. 1B and FIG. 1C. In another embodiment, a tooling ball rather than a small SMR is placed on a shank. The center of the tooling ball is determined by measuring points on the surface of the tooling ball.

In an embodiment, the probing system 400 is replaced by a probing system 460 that uses a triangulation scanner 462 instead of a tactile probe. Interior edges 412 and reflective markers 416 are measured using the triangulation scanner 462 instead of the tactile probe. Examples of triangulation scanners have been described herein above in reference to FIGS. 1E, 3G.

With 3D coordinates of the interior edges 430 and the reflective markers 416 measured using one of the methods described herein above, the performance of the light scanner 302 is next verified in a two-step procedure described in reference to FIGS. 4B, 4C. In the first step, the light scanner 302 projects light onto the reflective markers 416 and uses the angle measuring system of the beams-steering system 306 in combination with the optical detector 397 to determine the angles of the reflective markers 416 in the light-projector frame of reference. In an embodiment described above, angular encoders attached to galvanometer motors are used to determine a horizontal angle and a vertical angle of the projected beam of light. The light scanner projects light over the reflective markers 416 and determines an angular center of each reflector 416 based on the returned optical power as a function of steering angle. In most cases, at least six reflective markers 416 are provided on the artifact 410, which enables the light scanner 302 and the laser tracker 1310 to be placed in a common frame of reference. In one embodiment, the light scanner 302 includes a projector having a laser light source.

As illustrated in FIG. 4C, the light scanner 302 and associated processors determines the angular positions of the interior edges 412 in the frame of reference of the light scanner 302. In an embodiment, the light scanner 302 projects light in a pattern 430 over the interior edges 412. An operator views the projected lines and confirms that they properly overlap or overlay the interior edges, thereby confirming accurate operation of the light scanner 302.

In another embodiment, an artifact 510 constructed at a user site includes an inscribed pattern 512 and a collection of reflective markers 416. In an embodiment, a probing system 400 or a scanning probing system 460 is used to determine the 3D coordinates of the inscribed pattern 412 and the 3D coordinates of the reflective markers 416. In an embodiment, the probe end 402 or a projected light pattern from a triangulation scanner 462 is used to determine the 3D coordinates of the inscribed pattern. The probing system 400 or 460 is likewise used to determine the 3D coordinates of the reflective markers 416.

Figure 5A:
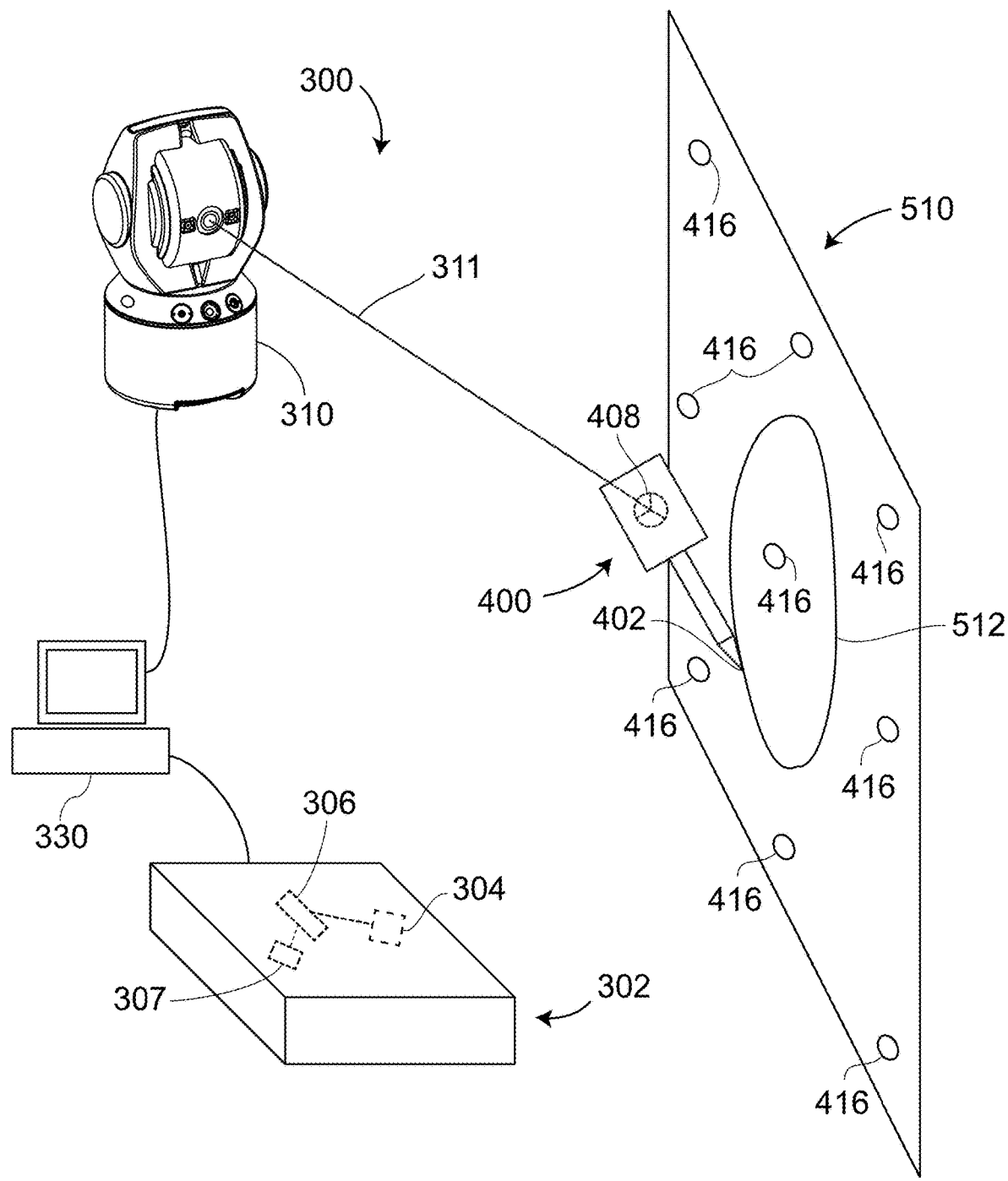
FIG. 5A is an schematic representation of measuring 3D coordinates of inscribed lines in an artifact with a laser-tracker-based tactile probe according to an embodiment of the present invention.
Figure 5B:
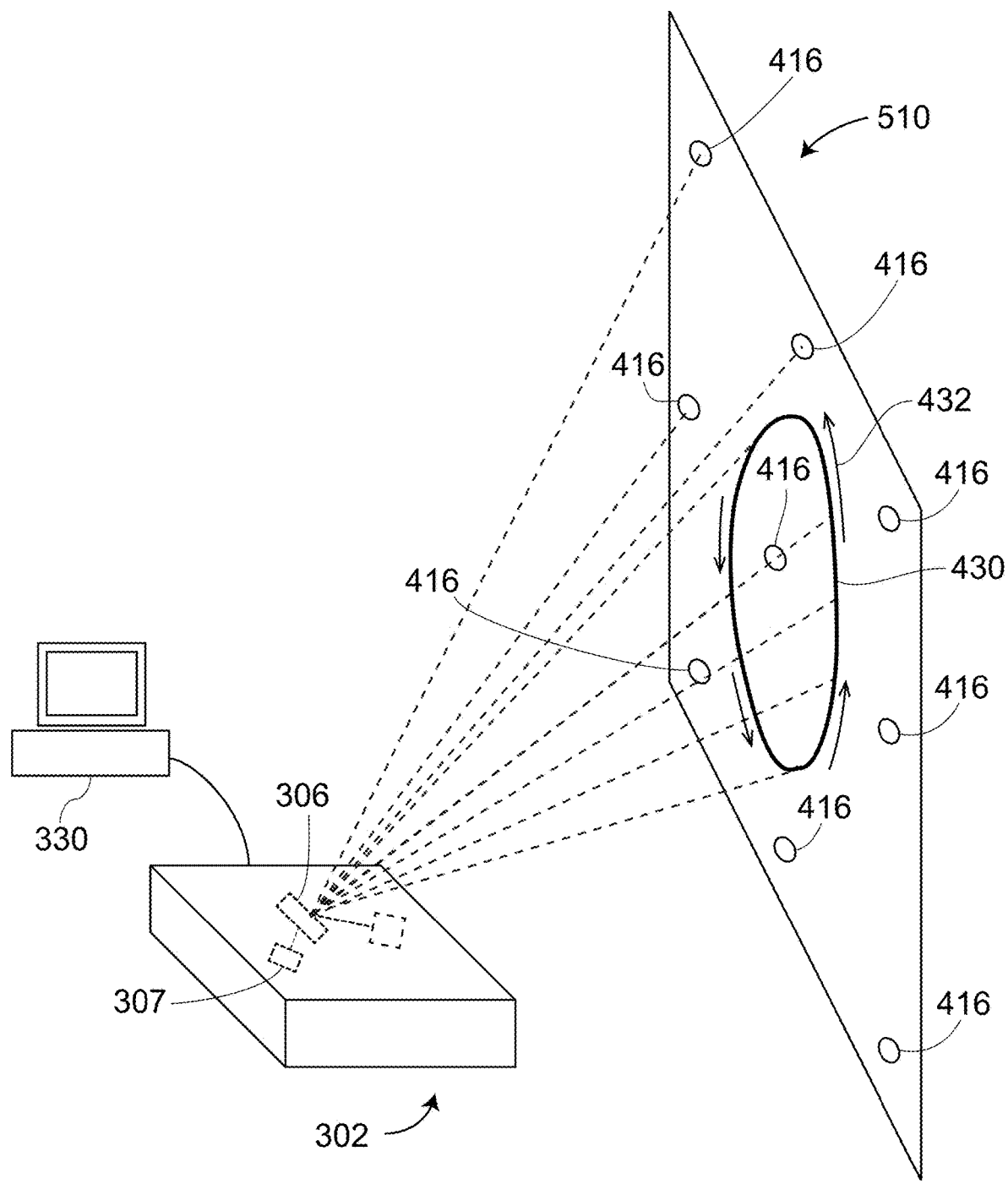
FIG. 5B is a schematic illustration of verifying projection accuracy of a light projector by projecting a template onto the inscribed pattern according to an embodiment of the present invention.

In an embodiment illustrated in FIG. 5B, the light projector determines the angles to the reflective markers 416 with the light scanner 302, as described above. This enables the light scanner 302 and laser tracker 1310 to be placed in a common frame of reference. In an embodiment, the performance of the light scanner 302 is verified by projecting light into a pattern 430 that matches the inscribed pattern 412. A user observes the projected pattern to make this verification.

Figure 6:
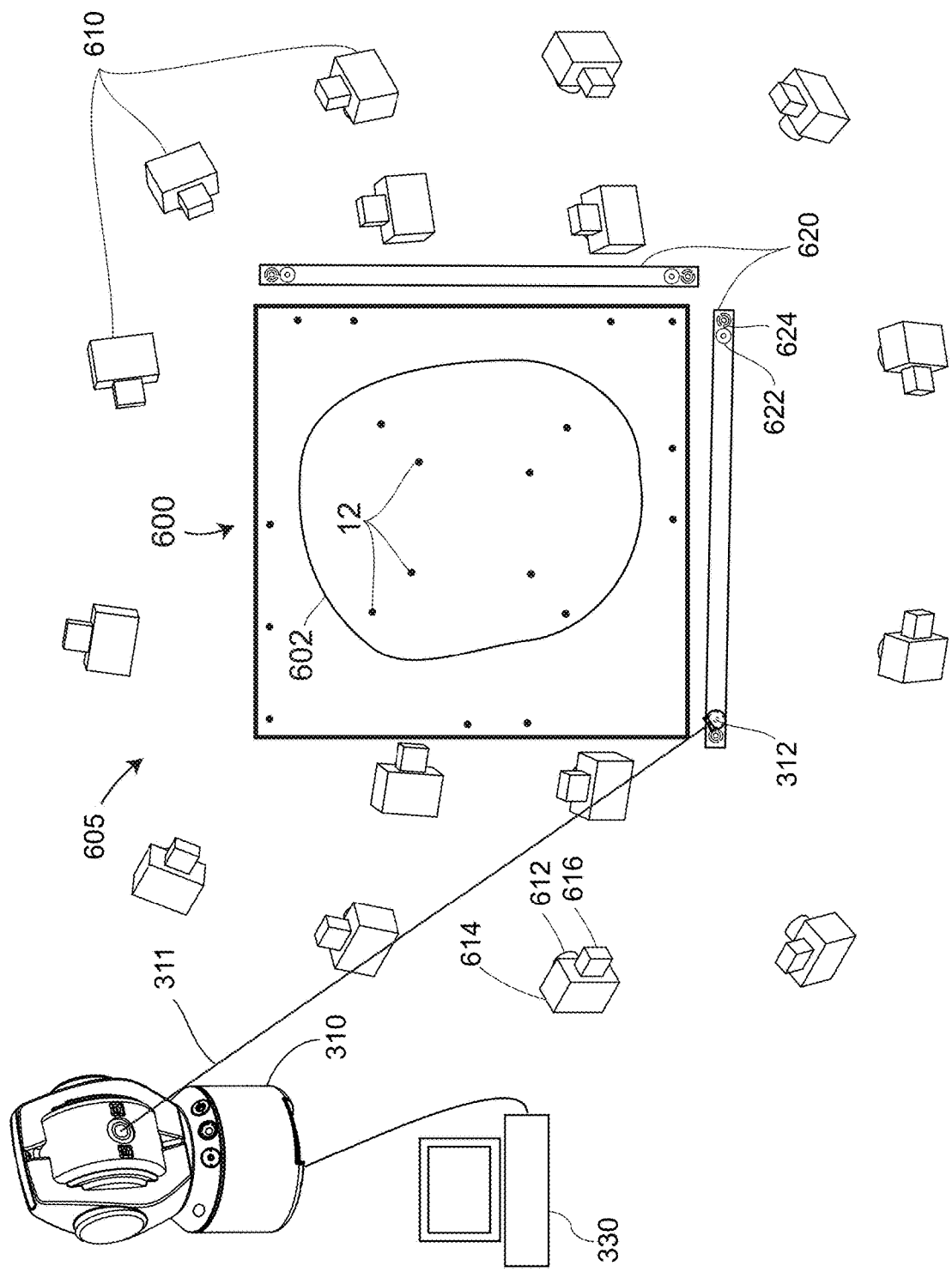
FIG. 6 is a schematic illustration of determining on an artifact the 3D coordinates of reflective markers and a marked pattern using a photogrammetry method.

In an embodiment illustrated in FIG. 6, a photogrammetry system 605 is used to determine the 3D coordinates of the reflective markers 12 as well as the 3D coordinates of the marked pattern 602 of the artifact 600. In an embodiment, the photogrammetry system includes a camera 610 and one or more scale bars 620. In an embodiment, the camera 610 includes a lens 612, a camera body 614 that includes a photosensitive array and electronics, and a flash unit 616. Each of the one or more scale bars 620 includes at least two reference positions. In an embodiment, the reference positions include a plurality of kinematic nests 622 configured to hold SMRs 312 for measurement by a laser tracker 310. In an embodiment, the length between each pair of nests is determined by tracker measurements of the SMR 312. In another embodiment, the reference positions include a plurality of markers 624, which may include coded markers of photogrammetric dots. In an embodiment, the length between the markers is known based on a previous calibration measurement. In an embodiment, the reference artifact is made of a material having a low coefficient of thermal expansion (CTE). An example of such a material includes Invar, which has a CTE of around 1.2/K. The camera takes a picture at each of a number of different camera locations. Usually 20 or so camera locations are selected, with the camera turned to more than one orientation during the shooting. In many cases, a flash such as the camera flash 616 is used to illuminate the photogrammetry targets. The camera captures an image of at least part of the reflective markers 12 and at least part of the marked pattern 602 at each of the camera poses. At least one scale bar is included in each camera image.

A processor uses triangulation calculations based on the camera images to solve for the 3D coordinates of each of the reflective markers 12, the six-DOF pose of the camera 610 in each camera location, and the camera compensation parameters to account for camera characteristics such as camera aberrations. The known reference lengths between the nests 622 or markers 624 are used to provide scale to the constructed coordinates of the reflective markers 12.

After determining the six-DOF pose of the camera 410 at each camera location, as described in the previous paragraph, it is further possible to determine the 3D coordinates of the marked pattern 602 using a method described herein below.

Figure 7A:
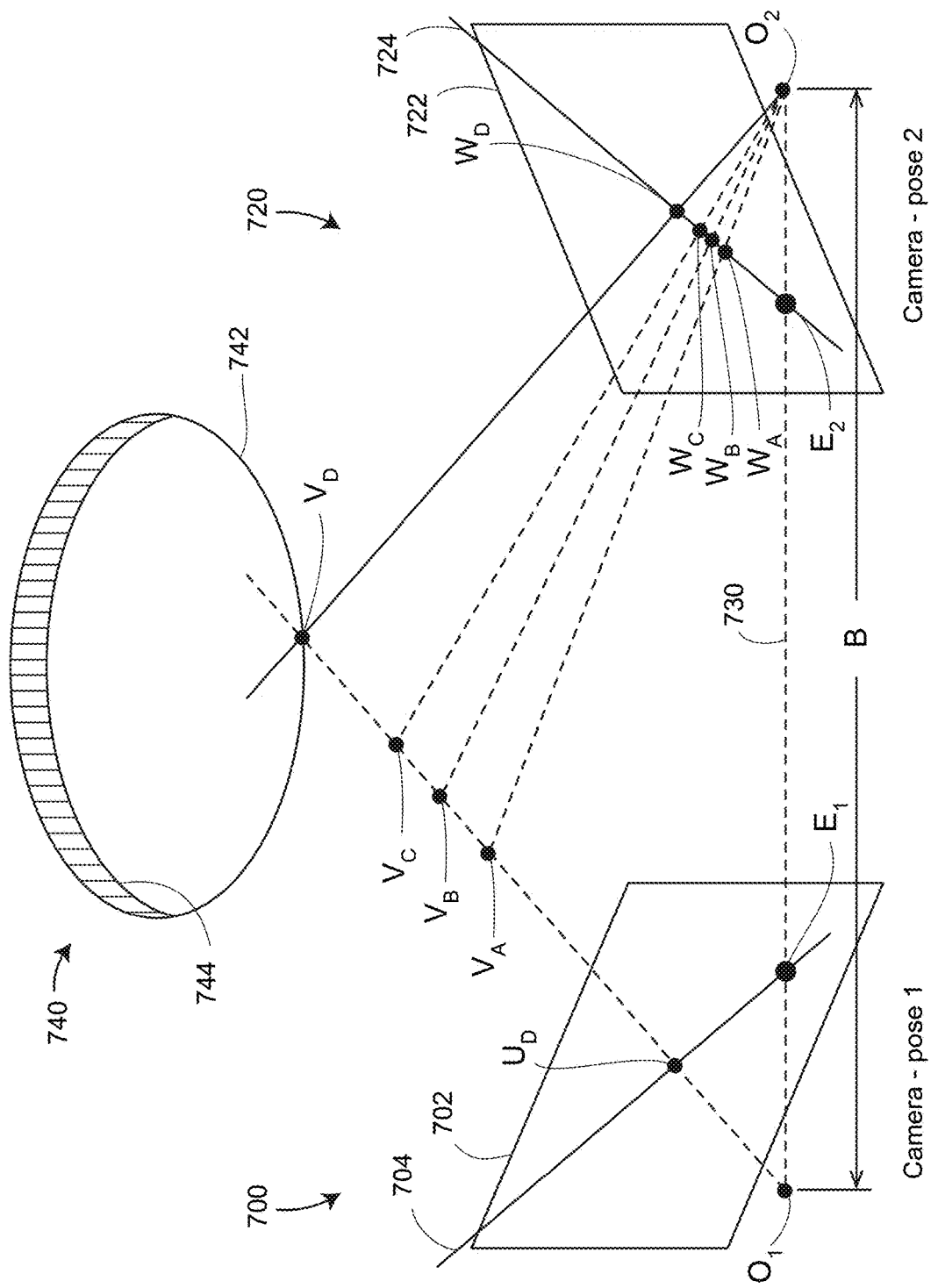
FIG. 7A is a schematic illustration of camera epipolar lines drawn for a point on continuous line according to an embodiment.

In FIG. 7A, a camera assembly in its first pose is designated 700 and in its second pose is designated 720. In each pose the cameras view edges of an object feature 740. In the example of FIG. 7A, the object feature 740 is hole having an upper edge 742 and a lower edge 744. The camera in the first pose 700 has a perspective center $O_1$, which is the point from which rays of light from the feature 740 appear to pass before reaching the camera photosensitive array when the camera is in the first pose. An epipolar plane 702 is established by projecting the plane of the camera photosensitive array symmetrically about the perspective center $O_1$. An epipolar plane is in general mathematically equivalent to the plane of the photosensitive array in the mathematical method that follows. Because the camera geometry is easier to visualize using epipolar planes than planes of photosensitive arrays, epipolar planes are used in the discussion that follows. For the camera in the first pose 700, the epipolar plane is 702.

The camera in the second pose 720 has a perspective center $O_2$, which is the point from which rays of light from the feature 740 appear to pass before reaching the camera photosensitive array when the camera is in the second pose. An epipolar plane 722 is established by projecting the plane of the camera photosensitive array symmetrically about the perspective center $O_2$. The epipolar plane 722 is in general mathematically equivalent to the plane of the photosensitive array in the method that follows. For the camera in the second pose, the epipolar plane is 722.

A line drawn between the perspective center $O_1$ and the perspective center $O_2$ is referred to as the baseline 730 between the camera in the first pose 700 and the camera in the second pose 720. The length of the baseline 730 is B. The baseline intersects the epipolar plane 702 at the epipole $E_1$, and it intersects the epipolar plane 722 at the epipole $E_2$. Consider a point $V_D$ on the edge 742. A ray from this point through the perspective center $O_1$ intersects the epipolar plane 702 at the point $U_D$. A ray drawn from the point $V_D$ through the perspective center $O_2$ intersects the epipolar plane 722 at the point $W_D$. A line that resides on an epipolar plane and that also passes through the epipole of that plane is referred to an epipolar line. The epipolar line 704 includes the point $U_D$, and the epipolar line 724 includes the point $W_D$. Because the points $O_1$, $O_2$, $E_1$, $E_2$, $W_D$, $U_D$, and $V_D$ all lie in a common plane, as do the epipolar lines 704 and 724, it follows that, if one epipolar line is known, there is enough information to determine the location of the other epipolar line. So if the epipolar line 704 is known, the epipolar line 724 may immediately be drawn.

If it is determined that the camera in the first pose 700 sees the point $V_D$ on the edge 742 as the point $U_D$ on the epipolar line 704, it follows that the camera in the second pose 720 will see the point $V_D$ as lying on the epipolar line 724, for example, as one of the points $W_A$, $W_B$, $W_C$, $W_D$ corresponding to the matching points $V_A$, $V_B$, $V_C$, $V_D$. If the edge 742 is smoothly continuous over a portion of the edge 3942 that includes the point $V_D$, then a one-to-one correspondence between the points $W_D$ and $U_D$ cannot be obtained from the epipolar analysis alone.

Figure 7B:
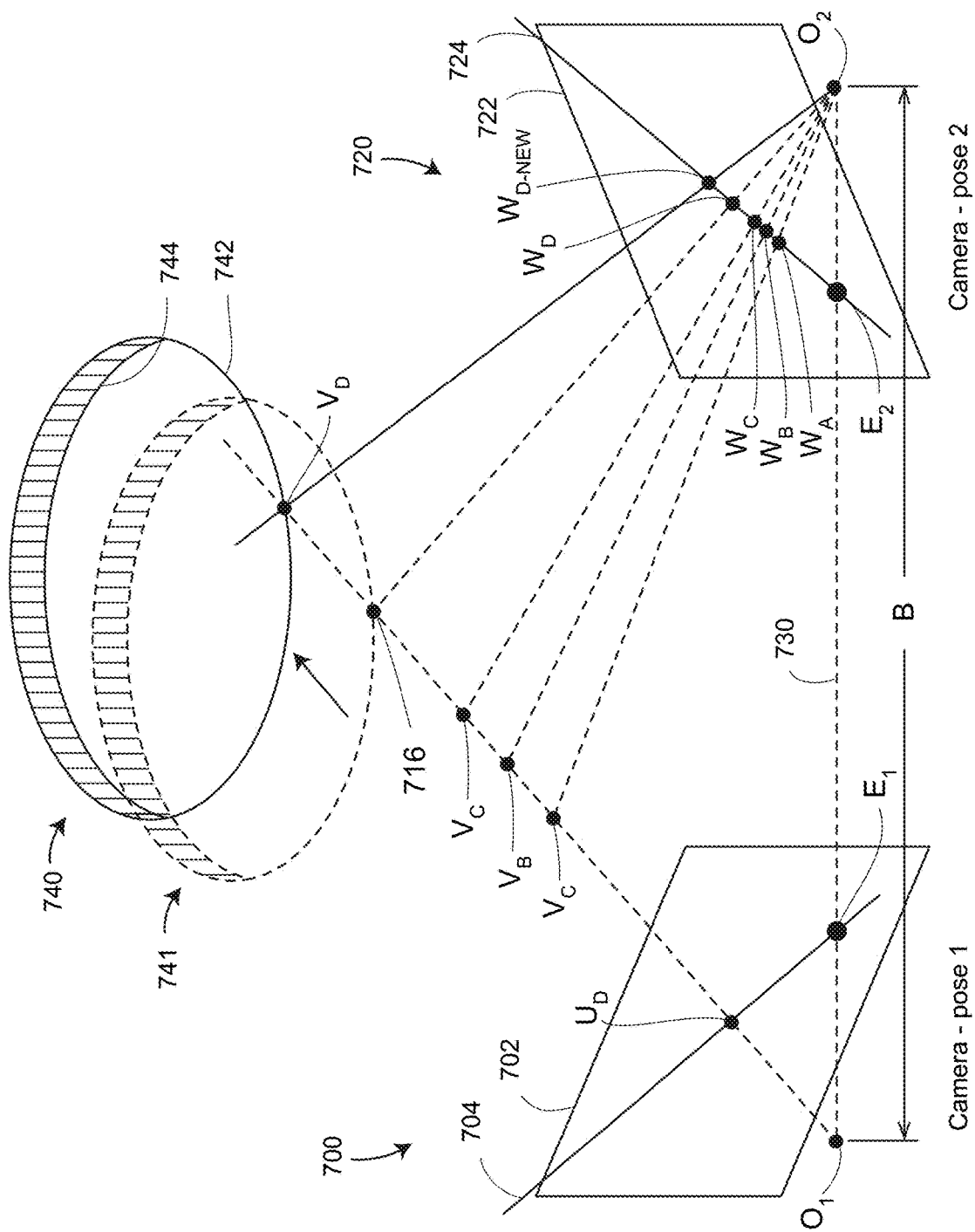
FIG. 7B is a schematic illustration of camera epipolar lines drawn for a point on the continuous line shifted in depth according to an embodiment.

FIG. 7B shows the case in which the point $U_D$ projected onto the epipolar plane 702 from the point $V_D$ does not uniquely define the position of the point $V_D$ on the epipolar line 724. For example, the point $V_D$ on the actual edge 742 of the actual hole 740 may have been mistakenly thought to lie on the edge of the hole 741 at the position 716. Because the edge 742 is smoothly continuous at the position of $V_D$, there is no way to make a direct matching of image points on the epipolar planes 702 and 722 unless some additional visual clues are present in the captured 2D images. In FIG. 7A, the point $W_D$ on the epipolar line 724 was thought to correspond to the point $V_D$ on the actual hole 740, whereas in fact the point $W_D$ is shown in FIG. 7B to correspond to the point 716 in FIG. 7B rather than the true point $V_D$, which is matched by the point $W_{D\text{-}NEW}$ on the epipolar line 724. In the situation illustrated in FIGS. 7A, 7B, a different method may be used to determine the true position in space of the edges 742, 744 of the object feature 740.

Figure 8:
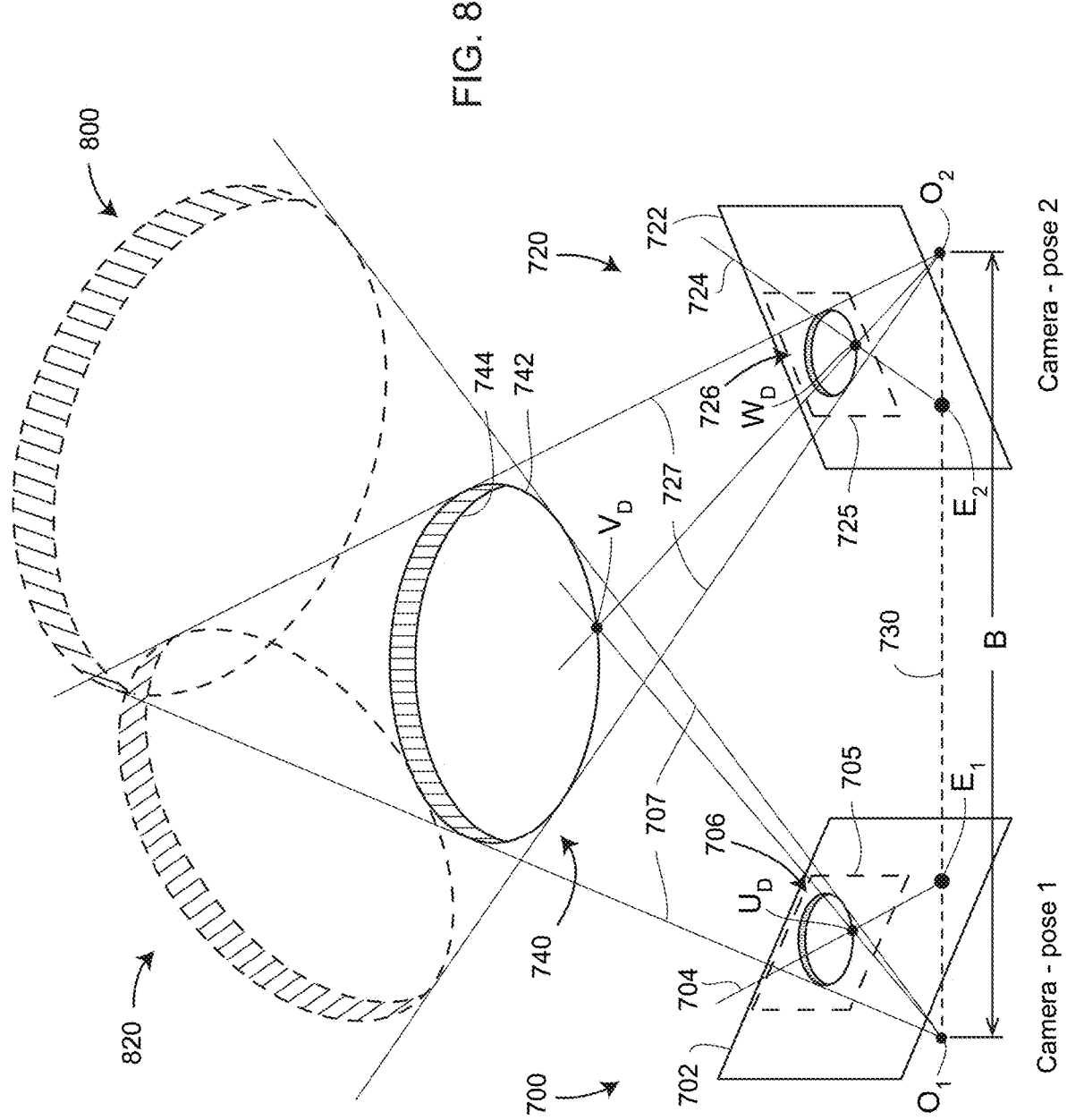
FIG. 8 is a schematic illustration showing corresponding points on a continuous object line and on camera image planes according to an embodiment.

FIG. 8 illustrates a method for determining the 3D coordinates of edge points on an object feature. The example shown in FIG. 8 is for the case in which the edge features reside on a plane, but methods described herein below generalize the method to extract 3D coordinates of edge points for objects having edge points that are not coplanar.

In the first pose 700, the camera has a perspective center $O_1$ and an epipolar plane 702. The photosensitive array of the camera captures an image 706 over an area corresponding to the region 705 of the epipolar plane 702. The image 706 of the object 740 appears on the photosensitive array of the camera and correspondingly on the epipolar plane 702. The camera in the second pose 720 has a perspective center $O_2$ and an epipolar plane 722. The photosensitive array of the camera captures an image 726 over an area corresponding to the region 725 of the epipolar plane 722. The image 726 appears on the photosensitive array of the camera and correspondingly on the epipolar plane 722. A point $V_D$ on the edge 742 projects an image point $U_D$ on the epipolar plane 702 and an image point $W_D$ on the epipolar plane 722. Epipoles $E_1$ and $E_2$ are obtained as described herein above with respect to FIGS. 7A, 7B. An epipolar line 704 may be drawn from $O_1$ through the image point $U_D$ and a corresponding epipolar line 724 may be drawn, but the location of the image point $W_D$ on the epipolar line 724 cannot be determined without further information since the edge point $V_D$ is not a cardinal point that enables direct determination of the correspondence between the points $U_D$ and $W_D$.

Figure 9:
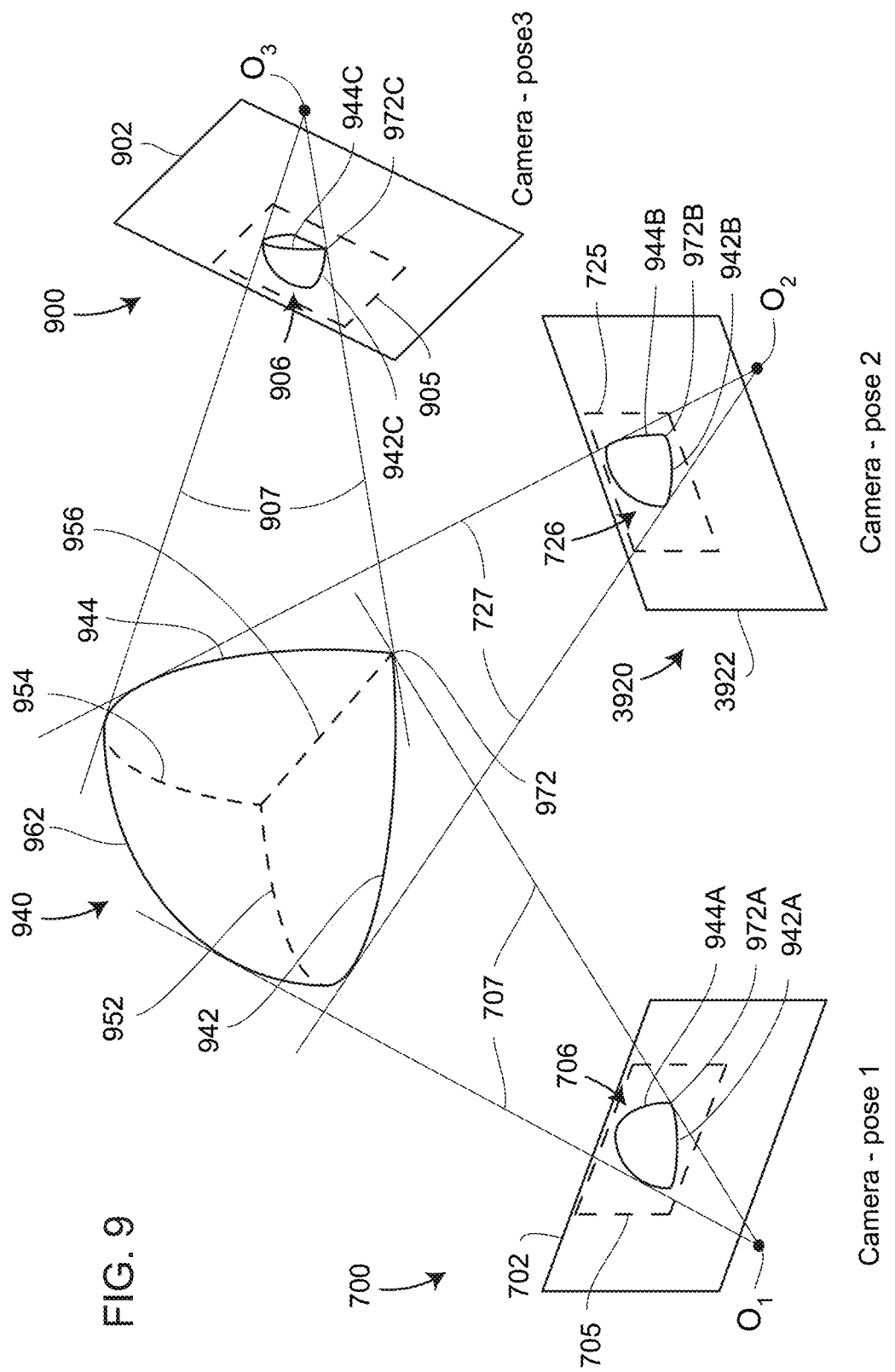
FIG. 9 is a schematic illustration of a 3D object and corresponding images in three camera poses according to an embodiment of the present invention.

For the general case in which edge features do not lie on a plane, the 3D coordinates of the edge features may be determined by further adding the camera assembly at a third pose 900 as shown in FIG. 9. The camera assembly at the third pose 900 has a perspective center $O_3$ and an epipolar plane 902. The photosensitive array of the camera captures an image over an area corresponding to the region 905 of the epipolar plane 902. An image 906 of the object 940 appears on the photosensitive array of the camera and correspondingly on the epipolar plane 902.

Figure 10:
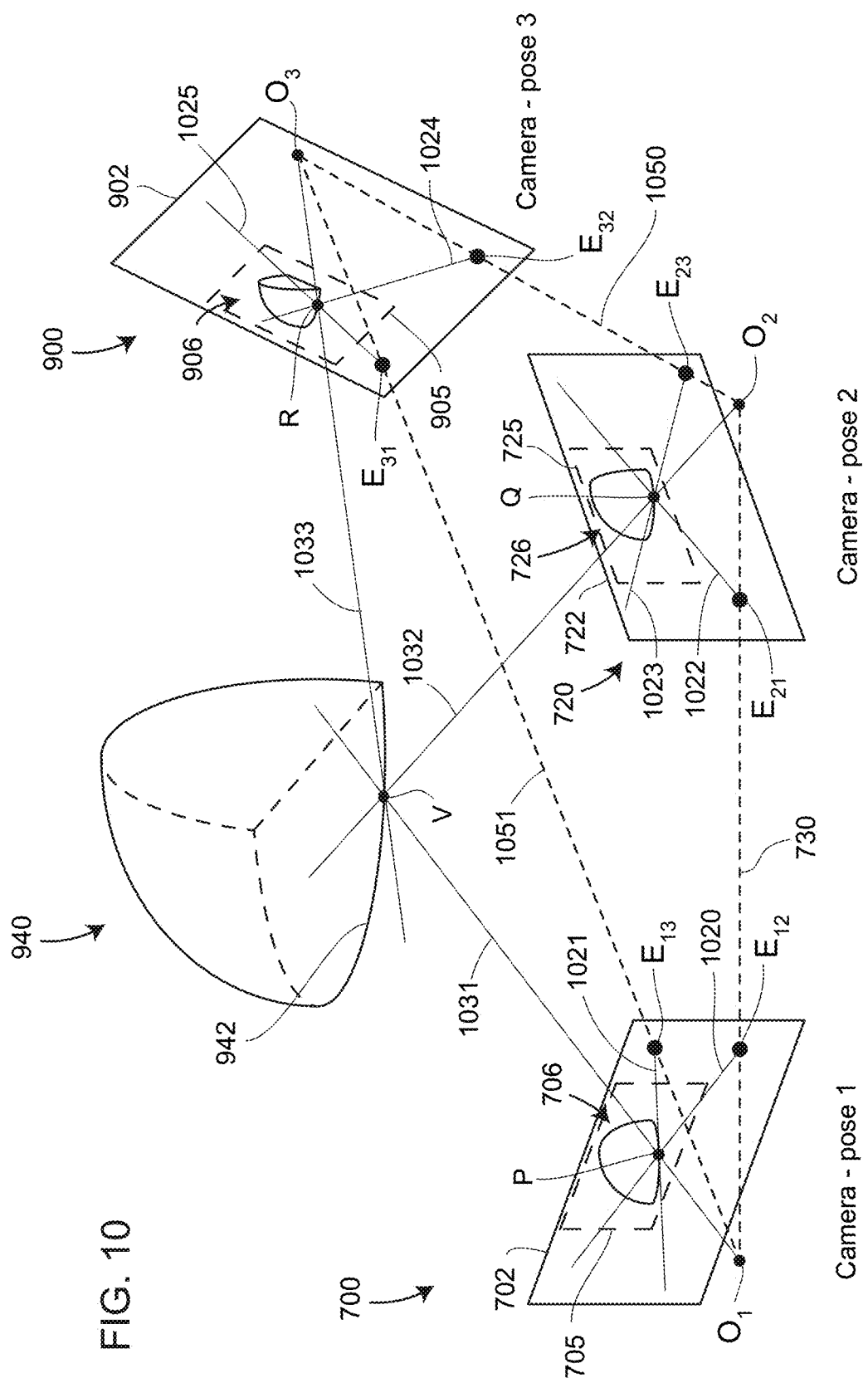
FIG. 10 is a schematic illustration showing finding of 3D coordinates of an object point on a continuous line using epipolar geometry of images of cameras in three different poses according to an embodiment of the present invention.

In an embodiment illustrated in FIG. 10, a 3D object 940 includes a point V on an edge 942 of the object. The method described herein below works even to find the 3D coordinates of a point V in a region for which the edge points are smoothly and continuously varying. As used herein, the expression "smoothly and continuously varying" means that there are no discontinuities in the 3D edge coordinates or in the slope of the 3D edge coordinates. In general, such a point is not a cardinal point—that is, a point that, when viewed in multiple camera images obtained from different camera poses, is recognized as being same point in 3D space. The point V is projected as a ray 1031 to the perspective center $O_1$ of the camera in the first pose 700, intersecting the epipolar plane 702 at the point P. The point V is projected as a ray 1032 to the perspective center $O_2$ of the camera in the second pose 720, intersecting the epipolar plane 722 at the point Q. The point V is projected as a ray 1033 to the perspective center $O_3$ of the camera in the third pose 900, intersecting the epipolar plane 902 at the point R.

The epipoles of the three epipolar planes are the points of intersection of the epipolar planes with the lines connecting the perspective centers of the cameras in the three poses. The epipolar plane 702 includes two epipoles. The epipole $E_{12}$ is the point at which the epipolar plane 702 is intersected by the line 730 that connects the perspective centers $O_1$ and $O_2$. Likewise, the epipole $E_{13}$ is the point at which the epipolar plane 702 is intersected by the line 1051 that connects the perspective centers $O_1$ and $O_3$. The epipoles $E_{21}$, $E_{23}$ are the points at which the epipolar plane 722 is intersected by the lines 730, 1050, respectively. The epipoles $E_{31}$, $E_{32}$ are the points at which the epipolar plane 902 is intersected by the lines 1051, 1050, respectively.

The epipolar lines are lines that pass through the epipoles and through a point of interest on the epipolar plane. Because the points $E_{12}$, $E_{21}$, and P lie on a common plane, the epipolar line 1020 drawn from $E_{12}$ to the point P can immediately be used to draw the corresponding epipolar line 1022 on the epipolar plane 722. Any one epipolar line can be used to generate a corresponding epipolar line on an adjacent epipolar plane.

Consider the case illustrated in FIG. 10 in which an edge point P is selected on the image 706. An epipolar line 1020 is found that passes through the point P and the epipole $E_{12}$. As explained herein above, the epipolar line 1022 that corresponds to the epipolar line 1020 can immediately be drawn. If the points P and Q faithfully represent the point V, for example, without excessive noise, then the epipolar line 1022 passes through the point Q on the epipolar plane 722. However, as explained herein above with respect to FIG. 7B, without further information, it is not known where the point Q lies on the epipolar line 1022. Without this information, it is not possible to perform a triangulation calculation to determine the 3D coordinates of the point V. This problem can be overcome by further adding the epipole $E_{23}$ to the epipolar plane 722. The intersection of the epipoles $E_{21}$, $E_{23}$ on the epipolar plane 722 locates the position of the point Q on the epipolar plane 722 and enables determination of the 3D coordinates of the point V. In like manner, the point R can be identified as the intersection of the epipolar lines 1024, 1025. The point P is crossed by the epipolar line 1021 as well as the epipolar line 1020.

As explained in the preceding paragraphs, moving the photogrammetry camera 610 to three or more poses provides a way to determine the 3D coordinates of points on the marked pattern 602. The photogrammetry procedure of FIG. 6 uses three or poses and, in the typical case, twenty poses or so. The reflective markers 12 may be placed on any object in a user's facility. The marked pattern 602 may likewise be marked on the same object. Marking of the marked pattern may be carried out with permanent ink marker, for example. Alternatively, the pattern may be inscribed into the object, for example, inscribed by using a handheld inscribing tool. In an embodiment, the marked pattern may applied to produce a relatively high contrast when viewed against the background. For example, the marked background may be made of a reflective material. Likewise, an inscribed pattern may be coated within the inscribed lines with a reflective material.

Figure 11A:
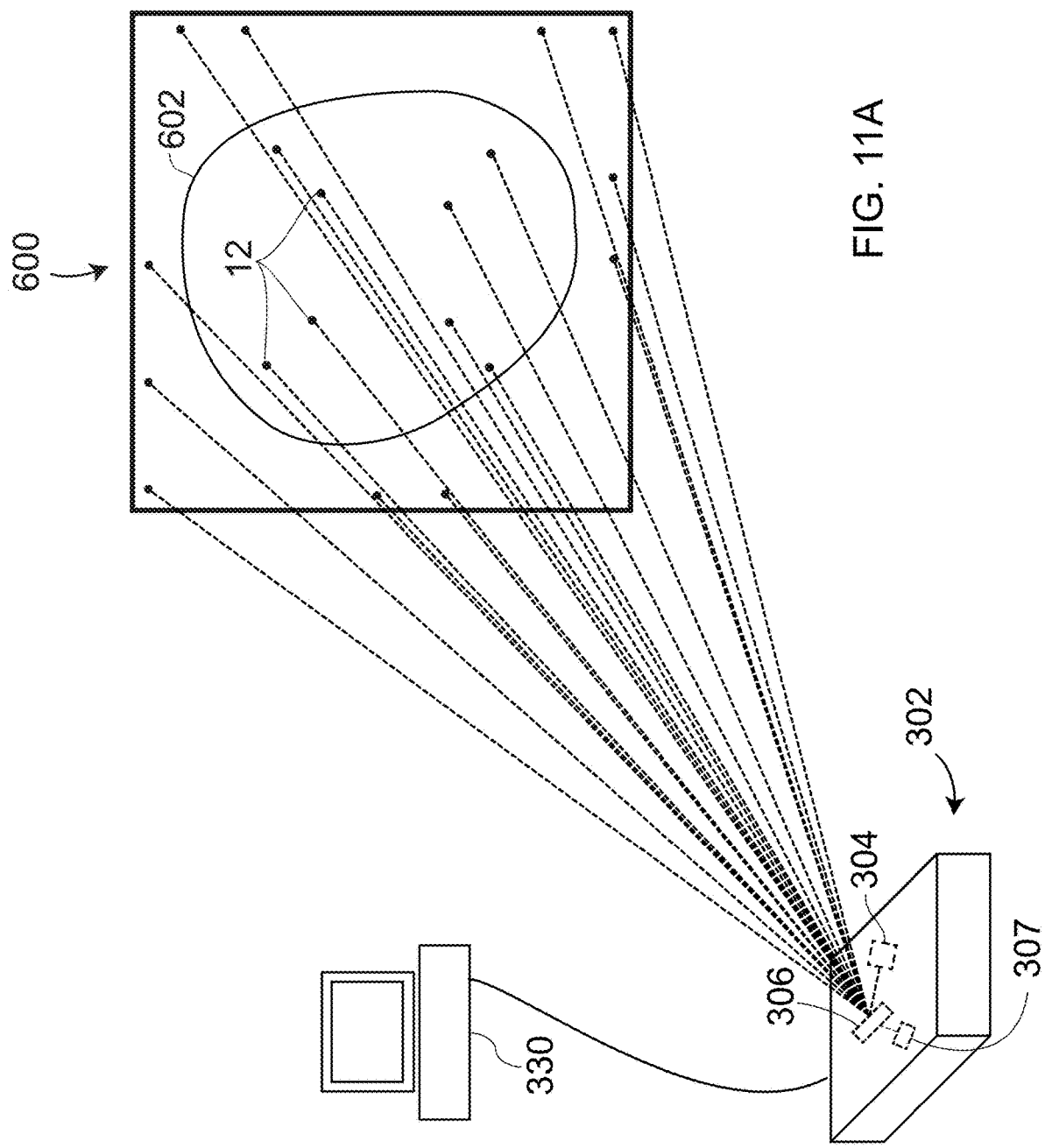
FIG. 11A is a schematic illustration of measuring angles of reflective markers with a light projector according to an embodiment of the present invention.
Figure 11B:
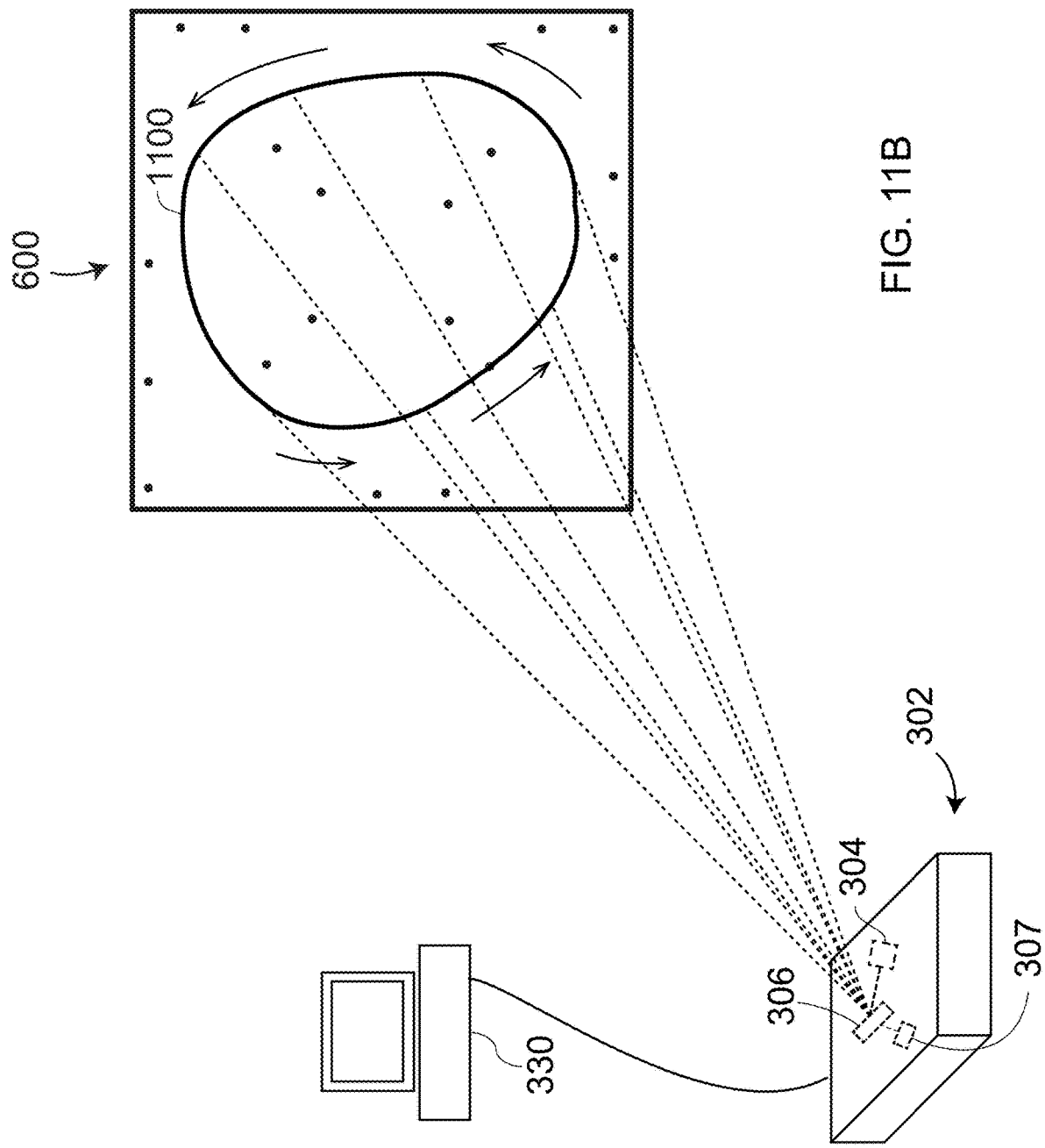
FIG. 11B is a schematic illustration of a projecting a pattern of light onto the marked pattern on the artifact according to an embodiment of the present invention.

FIGS. 11A, 11B show a method for verifying the performance of the light scanner 302 for the artifact 600, which in an embodiment is constructed on a user's site using convenient objects of arbitrarily large size. In FIG. 11A, the light scanner 302 measures the angles to the reflective markers 12. It uses these measured angles, as well as the 3D coordinates of the reflective markers 12 obtained in the photogrammetry method described above in reference to FIG. 6, to determine the 3D coordinates of the marked pattern 602 as measured by the photogrammetry system. In FIG. 11B, the light projector projects the glowing template light onto the marked pattern 602. A user verifies the performance of the light scanner 302 by confirming that the projected pattern of light 1100 overlays the marked pattern 602.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method comprising:
    establishing a reference artifact that includes a marked pattern, the marked pattern being drawn on a surface of the reference artifact or inscribed into the surface of the reference artifact, the reference artifact further including a collection of reflective markers;
    capturing with a camera an image of the marked pattern, the collection of reflective markers, and at least one reference length having a reference-length value at each of three or more camera poses;
    determining with a processor 3D coordinates of the collection of reflective markers and 3D coordinates of the marked pattern based at least in part on the three or more camera images and on the at least one reference-length value;
    measuring angles of a beam of light projected by a laser scanner to the collection of reflective markers;
    projecting a pattern of light onto the marked pattern with the light scanner, the projected pattern of light based at least in part on the measured 3D coordinates of the marked pattern, the measured 3D coordinates of each reflective marker in the collection of reflective markers, and the measured angles to the collection of reflective markers, wherein the pattern of light is defined by moving the light beam over a trajectory at a sufficient speed to appear as a glowing line to an operator; and
    storing the measured 3D coordinates of the marked pattern and the 3D coordinates of the collection of reflective markers.

2. The method of claim 1 further comprising
    verifying by an operator that the projected pattern of light overlaps the marked pattern.

* * * * *